United States Patent
Cho et al.

(10) Patent No.: US 12,027,168 B2
(45) Date of Patent: Jul. 2, 2024

(54) ELECTRONIC DEVICE AND METHOD FOR PROVIDING ASSISTANT SERVICE WITH UTTERANCE LIST

(71) Applicant: SAMSUNG ELECTRONICS CO., LTD., Suwon-si (KR)

(72) Inventors: Eunjoo Cho, Suwon-si (KR); Jina Kwon, Suwon-si (KR); Byungjeong Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 435 days.

(21) Appl. No.: 17/421,250

(22) PCT Filed: Dec. 10, 2019

(86) PCT No.: PCT/KR2019/017402
§ 371 (c)(1),
(2) Date: Jul. 7, 2021

(87) PCT Pub. No.: WO2020/145524
PCT Pub. Date: Jul. 16, 2020

(65) Prior Publication Data
US 2022/0122602 A1   Apr. 21, 2022

(30) Foreign Application Priority Data
Jan. 7, 2019   (KR) .................. 10-2019-0001922

(51) Int. Cl.
*G10L 15/22*   (2006.01)
*G10L 13/08*   (2013.01)
(Continued)

(52) U.S. Cl.
CPC .............. *G10L 15/22* (2013.01); *G10L 13/08* (2013.01); *G10L 15/063* (2013.01); *G10L 15/16* (2013.01); *H04N 21/42203* (2013.01)

(58) Field of Classification Search
CPC ....... G10L 15/22; G10L 13/08; G10L 15/063; G10L 15/16; G10L 13/00; G10L 15/04;
(Continued)

(56) References Cited

U.S. PATENT DOCUMENTS 9,318,108 B2   4/2016   Gruber et al.
9,870,772 B2   1/2018   Imamura
(Continued)

FOREIGN PATENT DOCUMENTS

KR   10-2012-0019003 A   3/2012
KR   10-1654580 B1       8/2016
(Continued)

OTHER PUBLICATIONS

International Search Report (PCT/ISA/210) and Written Opinion (PCT/ISA/237) issued by the International Searching Authority in International Application No. PCT/KR2019/017402, dated May 29, 2020.

*Primary Examiner* — Michael N Opsasnick
(74) *Attorney, Agent, or Firm* — Sughrue Mion, PLLC

(57) ABSTRACT

A method of providing an assistant service, performed by an electronic device, includes: determining content identification information for identifying content displayed on the electronic device; determining a user context for identifying a use situation of a user of the electronic device by using the determined content identification information; generating an utterance list based on the determined content identification information and the determined user context; and, in response to an occurrence of a predefined utterance providing event, outputting the generated utterance list.

14 Claims, 18 Drawing Sheets

(51) Int. Cl.
*G10L 15/06* (2013.01)
*G10L 15/16* (2006.01)
*H04N 21/422* (2011.01)

(58) Field of Classification Search
CPC .............. G10L 15/26; G10L 2015/228; H04N 21/42203; H04N 21/4316; H04N 21/44218; H04N 21/4668; H04N 21/4826; H04N 21/8405; H04N 21/4666; H04N 21/47217; H04N 21/47815; H04N 21/4828; H04N 21/4852; H04N 21/4854; H04N 21/4394; G06N 3/08
See application file for complete search history.

(56) References Cited

U.S. PATENT DOCUMENTS

| | | | |
|---|---|---|---|
| 9,922,642 | B2 | 3/2018 | Pitschel et al. |
| 10,158,745 | B2 | 12/2018 | Lee et al. |
| 11,087,759 | B2 | 8/2021 | Lemay et al. |
| 2015/0340042 | A1* | 11/2015 | Sejnoha ............... H04M 1/724 704/275 |
| 2017/0018276 | A1* | 1/2017 | Gunn .................... G06F 1/3231 |
| 2017/0214778 | A1* | 7/2017 | Lee ....................... H04M 1/271 |
| 2018/0180891 | A1* | 6/2018 | Kim ...................... A61B 3/0025 |
| 2018/0188945 | A1* | 7/2018 | Garmark ............... G06F 3/167 |
| 2018/0189023 | A1* | 7/2018 | Garmark .......... H04N 21/25891 |
| 2018/0189278 | A1* | 7/2018 | Garmark ............... G06F 16/433 |
| 2018/0234261 | A1 | 8/2018 | Choi et al. |
| 2018/0261211 | A1 | 9/2018 | Dolan et al. |
| 2018/0277112 | A1* | 9/2018 | Kim ....................... G06F 3/165 |
| 2018/0307303 | A1* | 10/2018 | Powderly ............... G06F 1/163 |
| 2022/0122602 | A1* | 4/2022 | Cho ................... H04N 21/4394 |

FOREIGN PATENT DOCUMENTS

| | | |
|---|---|---|
| KR | 10-1755376 B1 | 7/2017 |
| KR | 10-2017-0107058 A | 9/2017 |
| KR | 10-2017-0121090 A | 11/2017 |
| KR | 10-2018-0074562 A | 7/2018 |
| KR | 10-2018-0093756 A | 8/2018 |
| KR | 10-2018-0110977 A | 10/2018 |

* cited by examiner

FIG. 9

| USE MODES | DETAILS |
|---|---|
| SEARCH MODE | SEARCH FOR CONTENT TO BE REPRODUCED |
| DEVICE SETTING MODE | DEVICE SETTING FOR REPRODUCING CONTENT |
| CONTENT REPRODUCTION MODE | REPRODUCING CONTENT |
| CONTENT TERMINATION MODE | AFTER COMPLETION OF REPRODUCTION OF CONTENT |

FIG. 13

| UTTERANCE PROVIDING EVENT—1350 | |
|---|---|
| PREDEFINED EVENT CONDITIONS —1360 | TRIGGER SIGNAL—1370 |
| WHEN SCREEN OF ELECTRONIC DEVICE IS MAINTAINED FOR PRESET PERIOD OF TIME AND USER REQUESTS HELP—1362 | IN CASE OF RECEPTION OF USER INPUT INCLUDING TRIGGER SIGNAL (E.G., "HELP ME, BIXBY") |
| IN CASE WHERE ELECTRONIC DEVICE OPERATES FOR FIRST TIME IN MORNING—1363 | |
| IN CASE WHERE ELECTRONIC DEVICE OPERATES FOR FIRST TIME IN MORNING AND PREDEFINED WEATHER INFORMATION IS RECEIVED—1364 | |
| IN CASE WHERE INPUT SIGNAL IS RECEIVED FROM ANOTHER ELECTRONIC DEVICE CONNECTED TO ELECTRONIC DEVICE—1365 | |
| IN CASE WHERE PRESET PERIOD OF TIME ELAPSES AFTER SCREEN OF ELECTRONIC DEVICE IS SWITCHED—1366 | |
| IN CASE WHERE OTHER CONDITIONS DIRECTLY SET BY USER ARE SATISFIED—1367 | |

FIG. 15
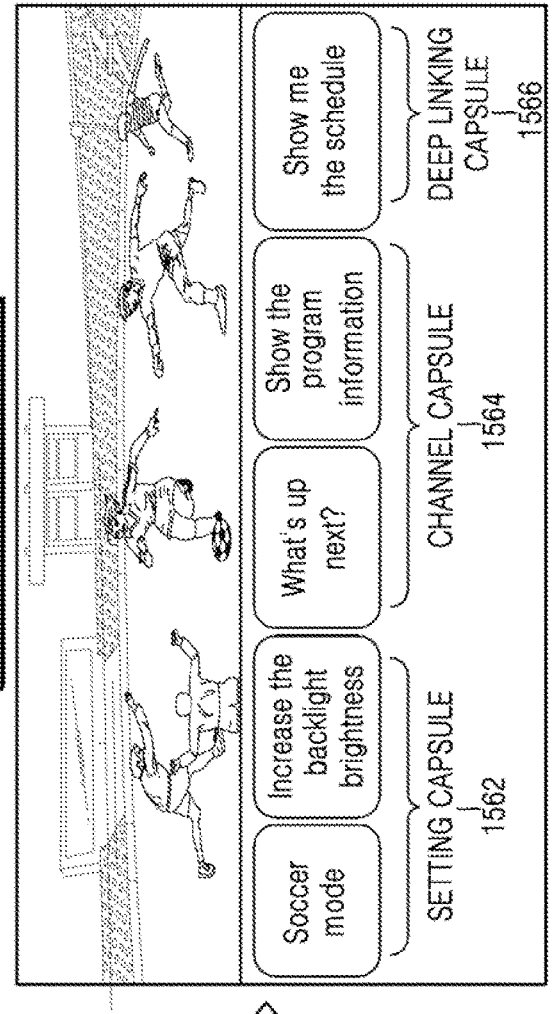
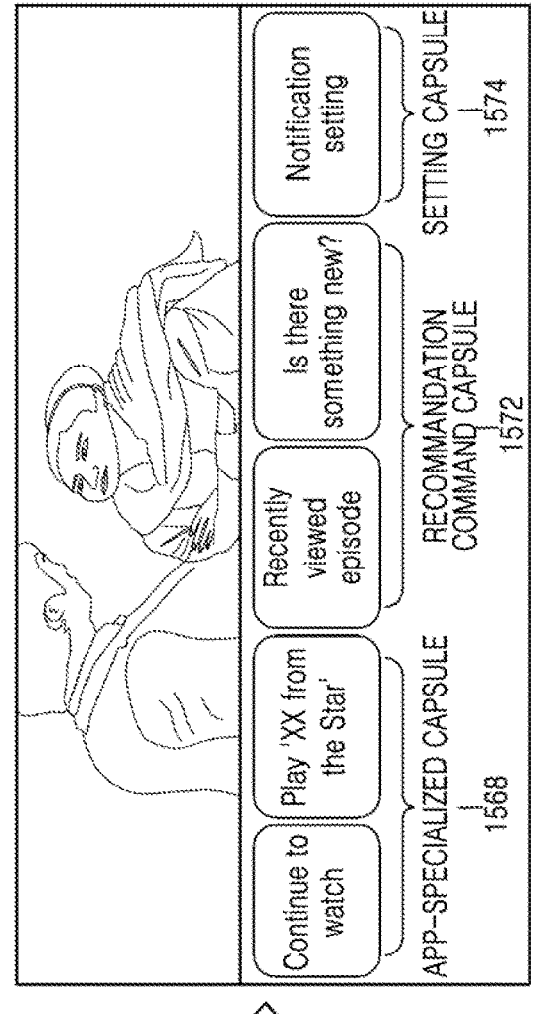

ELECTRONIC DEVICE AND METHOD FOR PROVIDING ASSISTANT SERVICE WITH UTTERANCE LIST

TECHNICAL FIELD

The present disclosure relates to a method and device for providing an assistant service, and more particularly, to an electronic device for providing an assistant service by providing an utterance list to a user.

BACKGROUND ART

An artificial intelligence (AI) system is a system in which a machine learns, performs determination on its own, and becomes smart, unlike existing rule-based smart systems. Because the artificial intelligence system exhibits an improved recognition rate, and a more accurate understanding of user preference the more it is used, existing rule-based smart systems are gradually being replaced with deep learning-based artificial intelligence systems. The artificial intelligence technology includes machine learning (deep learning) and element technologies utilizing machine learning.

The machine learning is an algorithm technology that classifies/learns features of input data by itself, and the element technologies are technologies that utilize machine learning algorithms such as deep learning, and cover technical fields such as linguistic understanding, visual understanding, inference/prediction, knowledge representation, operation control, and the like.

The artificial intelligence technology may be applied to various fields, and particularly, as a technology for recognizing, applying, and processing human language/characters, may be used for natural language processing, machine translation, dialogue systems, query response, speech recognition/synthesis, and the like. Representative embodiments of artificial intelligence technology for understanding and processing human language may include automated assistant services.

The automated assistant services may interact with a user through various electronic devices such as a smart phone, a tablet computer, a wearable device, or the like, and the assistant services may receive a typed or spoken natural language input from the user and output a visual or audible response, in response to the received user input.

The assistant services may be provided through a virtualized assistant installed in a smart phone, a display device, or the like, and technologies for controlling various electronic devices through the assistant services have been developed in recent years. In addition, the assistant services may be installed in display devices having various forms and various functions, such that, when the display devices receive at least one of a plurality of content items through various wired/wireless communication networks and provide the received content item to users, a more convenient display environment may be provided to the users. That is, the display devices equipped with the assistant services may achieve a function corresponding to various needs or intentions of a consumer by using an assistant model.

However, electronic devices that provide general assistant services have issues in that they require a predefined user input in order to provide the assistant services, and, in the case where the user of the electronic devices does not know the predefined user input, the electronic devices are unable to sufficiently provide the assistant services. Furthermore, because electronic devices that provide conventional assistant services provide the assistant services only if a predefined user input is received, there is an issue in that the intention and needs of the users using the electronic devices are not well reflected.

DESCRIPTION OF EMBODIMENTS

Technical Problem

According to an embodiment, an electronic device for providing an assistant service capable of increasing convenience and satisfaction for a user of the electronic device may be provided.

In addition, according to an embodiment, an electronic device for outputting an utterance list based on characteristics of content displayed on the electronic device and a use situation of a user of the electronic device may be provided.

Solution to Problem

According to an embodiment, a method of providing an assistant service, performed by an electronic device, may include: determining content identification information for identifying content displayed on the electronic device; determining a user context for identifying a use situation of a user of the electronic device by using the determined content identification information; generating an utterance list based on the determined content identification information and the determined user context; and, in response to an occurrence of a predefined utterance providing event, outputting the generated utterance list.

According to an embodiment, the determining of the content identification information may include: determining whether a screen of the electronic device is switched; and, in response to the screen of an electronic device being switched, determining the content identification information after a preset period of time elapses from a time point at which the screen of the electronic device is switched.

According to an embodiment, the content identification information may be determined based on at least one of channel information of the electronic device, address information of the content displayed on the screen of the electronic device, information about an in-screen layout of the electronic device, and information about a text recognized on the screen of the electronic device.

According to an embodiment, the determining of the user context may include: determining use modes of the electronic device based on whether a screen of the electronic device is switched and the determined content identification information; and determining the user context based on at least one of a user input received from the user, device use information of the user with respect to the electronic device, operation state information indicating a current operation state of the electronic device, and the content identification information, for each of the determined use modes.

According to an embodiment, the use modes of the electronic device may include at least one of a search mode for searching for content to be displayed on the electronic device, a device setting mode for reproducing the content, a content reproduction mode, and a content reproduction termination mode, and the operation state information of the electronic device may further include information about a time when an operation of the electronic device is performed.

According to an embodiment, the generating of the utterance list may include: generating the utterance list by using a learning model of an assistant program which is pre-trained based on the content identification information and the user context; and, when the learning model of the assistant program is not trained, generating the utterance list by using predefined utterances according to the determined content identification information and the user context.

According to an embodiment, the learning model of the assistant program may be a learning model that is trained by using at least one of machine learning, neural network, genetic, deep learning, and classification algorithms as an artificial intelligence algorithm.

According to an embodiment, the learning model of the assistant program may generate different utterance lists according to at least one of an account of the user, a genre of the content displayed on the electronic device, an actor of the content displayed on the electronic device, and a date of viewing the content.

According to an embodiment, the predefined utterance providing event may occur when a user input received from the user includes a trigger signal for outputting the utterance list.

According to an embodiment, the predefined utterance providing event may occur based on at least one of information about a current time, information about current weather, information about a channel maintaining time of the electronic device, operation state information of the electronic device, external input information received from another electronic device connected to the electronic device, and screen switch information of the electronic device.

According to an embodiment, the outputting of the utterance list may include: determining an output intensity of the utterance list based on a user response to the output utterance list; and outputting the generated utterance list as at least one of visual data and voice data (text to speech (TTS)) according to the determined output intensity.

According to an embodiment, the outputting of the utterance list may include: determining a priority for outputting the utterance list according to the determined content identification information and the determined user context; and outputting the utterance list according to the determined priority.

According to an embodiment, the method may further include: receiving a response to the output utterance list from the user; and updating the generated utterance list by using the received response.

According to an embodiment, the outputting of the utterance list may further include generating an utterance cluster including at least one utterance list by clustering the generated utterance list according to a service of the electronic device and a type of the content displayed on the electronic device, and the generated utterance list may be output for the each generated utterance cluster.

In addition, according to another embodiment, an electronic device for providing an assistant service may include: an output unit; a memory storing one or more instructions; and one or more processors configured to provide the assistant service by executing the one or more instructions, wherein the one or more processors are further configured to determine content identification information for identifying content displayed on the electronic device, determine a user context for identifying a use situation of a user of the electronic device by using the determined content identification information, generate an utterance list based on the determined content identification information and the determined user context, and, in response to an occurrence of a predefined utterance providing event, output the generated utterance list.

According to an embodiment, the processor may determine whether a screen of the electronic device is switched, and, in response to the screen of the electronic device being switched, determine the content identification information after a preset period of time elapses from a time point at which the screen of the electronic device is switched.

According to an embodiment, the content identification information may be determined based on at least one of channel information of the electronic device, address information of content displayed on a screen of the electronic device, information about an in-screen layout of the electronic device, and information about a text recognized on a screen of the electronic device.

According to an embodiment, the processor may determine use modes of the electronic device based on whether a screen of the electronic device is switched and the determined content identification information, and may determine the user context by using at least one of a user input received from the user, device use information of the user with respect to the electronic device, operation state information indicating a current operation state of the electronic device, and the content identification information, for each of the determined use modes.

According to an embodiment, the use modes of the electronic device may include at least one of a search mode for searching for content to be displayed on the electronic device, a device setting mode for reproducing the content, a content reproduction mode, and a content reproduction termination mode, and the operation state information of the electronic device may further include information about a time when an operation of the electronic device is performed.

In addition, according to another embodiment, a computer-readable recording medium having recorded thereon a program including instructions for performing: determining content identification information for identifying content displayed on the electronic device; determining a user context for identifying a use situation of a user of the electronic device by using the determined content identification information; generating an utterance list based on the determined content identification information and the determined user context; and, in response to an occurrence of a predefined utterance providing event, outputting the generated utterance list, may be provided.

Advantageous Effects of Disclosure

An electronic device and a method of providing an assistant service using the same according to the present disclosure may provide an assistant service even in the case where no predefined user input occurs. In addition, the electronic device and the method for providing an assistant service using the same according to the present disclosure may provide an assistant service reflecting a user's intention well.

BRIEF DESCRIPTION OF DRAWINGS

FIG. 9 is a diagram illustrating use modes of an electronic device used by the electronic device according to some embodiments, to determine a user context.

FIG. 13 is a diagram illustrating conditions for an electronic device to output a generated utterance list.

FIG. 15 is a diagram illustrating a screen on which utterance lists generated by an electronic device according to some embodiments are output according to priorities.

BEST MODE

Figure 1:
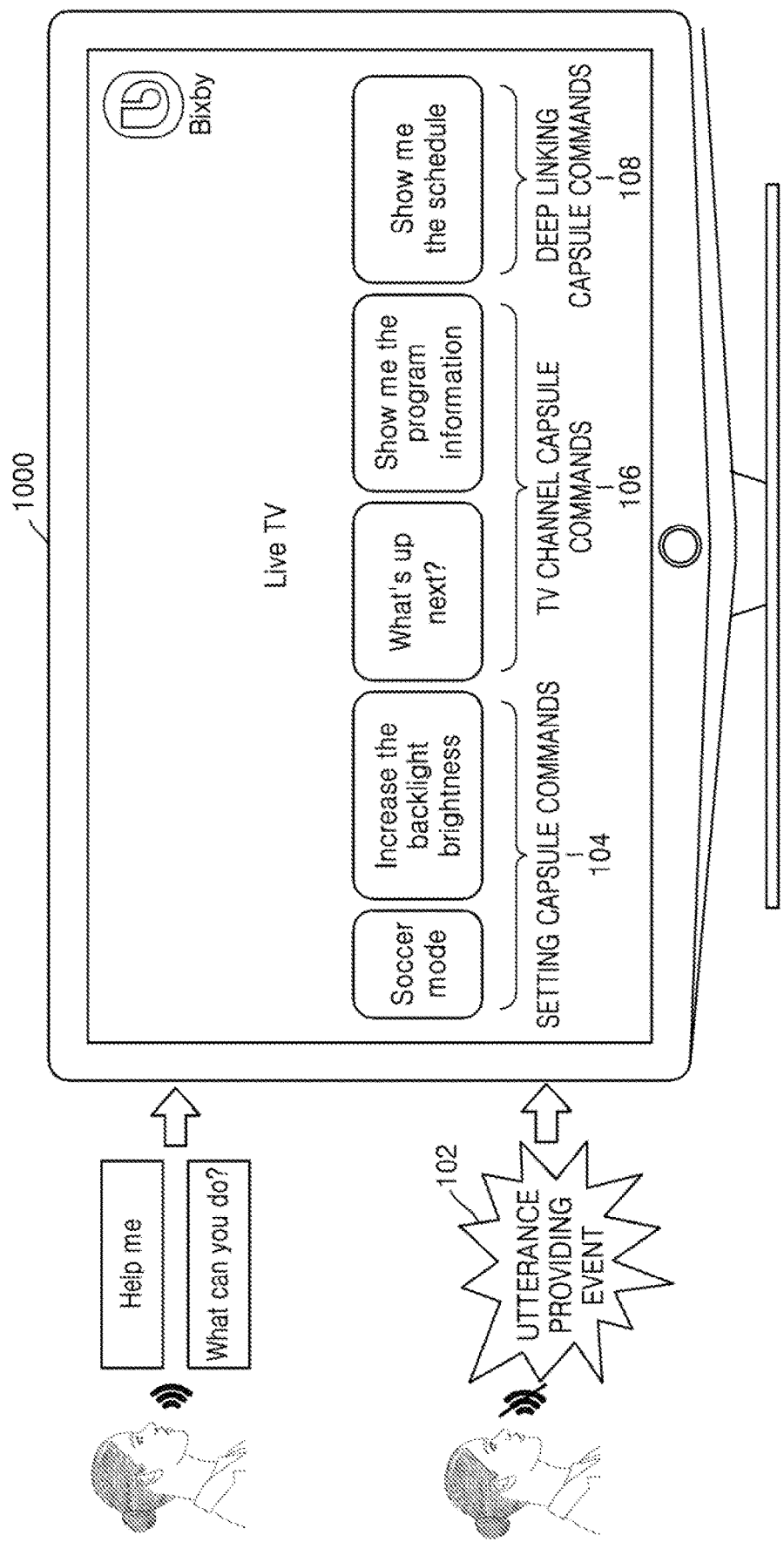
FIG. 1 is a diagram schematically illustrating a method, performed by an electronic device according to some embodiments, of providing an assistant service.

According to an embodiment, a method of providing an assistant service, performed by an electronic device, may include: determining content identification information for identifying content displayed on the electronic device; determining a user context for identifying a use situation of a user of the electronic device by using the determined content identification information; generating an utterance list based on the determined content identification information and the determined user context; and, in response to an occurrence of a predefined utterance providing event, outputting the generated utterance list.

In addition, according to another embodiment, an electronic device for providing an assistant service may include: an output unit; a memory storing one or more instructions; and one or more processors configured to provide the assistant service by executing the one or more instructions, wherein the one or more processors are further configured to determine content identification information for identifying content displayed on the electronic device, determine a user context for identifying a use situation of a user of the electronic device by using the determined content identification information, generate an utterance list based on the determined content identification information and the determined user context, and, in response to an occurrence of a predefined utterance providing event, output the generated utterance list.

Mode of Disclosure

Hereinafter, embodiments of the present disclosure will now be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. In order to clearly describe the present disclosure, portions that are not relevant to the description of the present disclosure are omitted, and similar reference numerals are assigned to similar elements throughout the present specification.

Throughout the specification, it will be understood that when an element is referred to as being "connected to" another element, it may be "directly connected to" the other element or be "electrically connected to" the other element through an intervening element. In addition, when an element is referred to as "including" a constituent element, other constituent elements may be further included not excluded unless there is any other particular mention on it.

In addition, in the present specification, an assistant service may be a service that provides a conversation with a user. In the assistant service described in the present specification, a response message may be provided to the user as if a human converses directly with the user, considering a user context of the user using the electronic device, characteristics of content displayed on the electronic device, and the like. In addition, the response message provided by the assistant service in the present specification may be provided to the user in a visual and/or audible manner.

In addition, in the present specification, a learning model of an assistant program for providing an assistant service may be a learning model that is trained by using at least one of machine learning, neural network, genetic, deep learning, and classification algorithms as an artificial intelligence algorithm.

The learning model of the assistant program for providing an assistant service may be a learning model that learns a criterion, a method, and the like, for providing a response message to the user. The learning model of the assistant service may include, for example, but is not limited to, a learning model for interpreting a user input (e.g., user voice), a learning model for generating a response message to be provided to the user, and a learning model for determining an output intensity of a response message.

Hereinafter, the present disclosure will be described in detail with reference to the accompanying drawings.

FIG. 1 is a diagram schematically illustrating a method, performed by an electronic device 1000 according to some embodiments, of providing an assistant service.

Referring to FIG. 1, the electronic device 1000 for providing an assistant service may receive a user input from a user, and provide the user with a response message with respect to the received user input.

The electronic device 1000 according to the present disclosure may determine whether a trigger signal for outputting an utterance list is included in the user input received from the user, generate, in the case where the trigger signal is included in the received user input, an utterance list, and provide the generated utterance list. The user input received by the electronic device 1000 according to an embodiment may include a user voice input received through a user input interface and a user touch input of touching a display screen of the electronic device.

According to another embodiment, in the case where the electronic device 1000 is operated by a remote controller (not shown), the user input may further include a user control input received from the remote controller. That is, the user input interface according to the present disclosure may receive the user control input received from the remote controller. In the case where a user input received through the user input interface includes words predefined as a trigger signal (e.g., "Help me", "What can you do?", etc.), the electronic device 1000 according to the present disclosure may provide the utterance list in response to the user input.

In addition, even in the case where no user input is received from the user, if a predefined utterance providing event 102 occurs, the electronic device 1000 according to the present disclosure may provide the user with an utterance list generated according to content identification information and a user context. The electronic device 1000 according to the present disclosure may generate utterance clusters by clustering generated utterance lists according to predefined criteria, and output the generated utterance lists in the generated utterance clusters. For example, in the case where content related to a soccer game is displayed in Live TV, the electronic device 1000 may provide the utterance lists in the utterance clusters including a setting capsule command 104 including utterance lists for setting the display device, a TV channel capsule command 106 including utterance lists related to a channel currently displayed on the electronic device, and a deep linking capsule command 108 including utterance lists provided by using an AI model which receives content displayed on the electronic device as an input and outputs a schedule related to the input content, as utterance clusters.

The electronic device 1000 according to an embodiment may be implemented in various forms. For example, the electronic device 1000 described in the present specification may be, but is not limited to, a digital camera, a mobile terminal, a smart phone, a laptop computer, a tablet PC, an electronic book terminal, a digital broadcasting terminal, a personal digital assistant (PDA), a portable multimedia player (PMP), a navigation system, an MP3 player, or the like.

The electronic device 1000 described in the present specification may be a wearable device that may be worn by a user. The wearable device may include at least one of an accessory-type device (e.g., a watch, a ring, a cuff band, an ankle band, a necklace, spectacles, and a contact lens), a head-mounted-device (HMD), a textile or garment-integrated device (e.g. electronic garments), a body attachment device (e.g., a skin pad), or a bioimplantable device (e.g., an implantable circuit), but is not limited thereto. Hereinafter, for convenience of description, the case where the electronic device 1000 is a display device for displaying content (e.g., a TV, a monitor, etc.) will be described.

Figure 2:
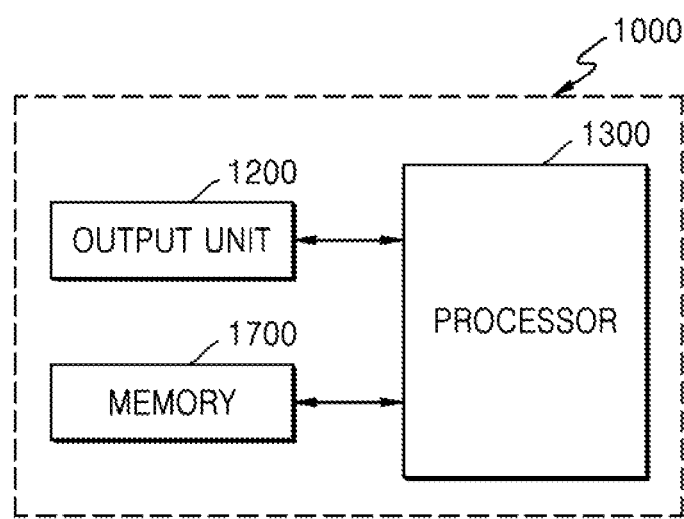
FIG. 2 is a block diagram illustrating an electronic device for providing an assistant service according to some embodiments.

FIG. 2 is a block diagram illustrating the electronic device 1000 for providing an assistant service according to some embodiments.

The electronic device 1000 according to some embodiments may include an output unit 1200, a processor 1300, and a memory 1700. For example, the output unit 1200 may include a display and a speaker. The output unit 1200 according to the present disclosure may output the generated utterance lists visually or audibly. Specifically, in order to allow the user to visually recognize video data including the generated utterance lists, the output unit 1200 may output an image corresponding to the video data through a display panel included in the electronic device 1000.

The processor 1300 according to an embodiment may execute one or more instructions stored in the memory 1700. The processor described in the present specification may be implemented as a single module, but may be implemented as a plurality of modules for dividing and performing functions of the electronic device 1000. For example, the processor 1300 may execute the one or more instructions stored in the memory 1700 to execute certain operations for providing the assistant service to the user.

Specifically, the processor 1300 may be connected to random-access memory (RAM) (not shown) used as a storage area for storing a signal or data input from the outside of the electronic device 1000 or corresponding to various operations performed in the electronic device 1000, and may be connected to read-only memory (ROM) (not shown) storing a control program for controlling the electronic device 1000 and/or a plurality of instructions, and the processor 1300 may include a graphic processing unit (not shown) for graphic processing with respect to a video.

In addition, the processor 1300 may be implemented as a system on chip (SoC) in which a core (not shown) and a GPU (not shown) are integrated. The processor (not shown) may include a single core, dual cores, triple cores, quad cores, or cores corresponding to a multiple thereof. Hereinafter, for convenience of description, the case where the processor 1300 performs a certain operation by executing at least one instruction stored in the memory 1700 in performing or controlling the certain operation will be described as an example.

According to an embodiment, the processor may determine content identification information for identifying content displayed on the electronic device, determine a user context for determining a use situation of the user of the electronic device by using the determined content identification information, generate an utterance list based on the determined content identification information and the determined user context, and output the generated utterance list in response to the occurrence of the predefined utterance providing event. As described above, the processor of the electronic device 1000 may generate the utterance list corresponding to the user's intention, by generating the utterance list based on identification information of the content displayed on the electronic device and the user context.

According to an embodiment, the processor may determine whether a screen of the electronic device is switched, and, in response to the screen of the electronic device being switched, determine the content identification information after a preset period of time elapses from a time point at which the screen of the electronic device is switched. As described above, because the processor of the electronic device 1000 determines the content identification information after the preset period of time elapses from the time point at which the screen of the electronic device is switched, the processor may accurately determine identification information of content for each screen, and accordingly, may determine the user context in which a user situation for each screen is better reflected.

According to an embodiment, the content identification information may be determined based on at least one of channel information of the electronic device, address information of content displayed on a screen of the electronic device, information about an in-screen layout of the electronic device, and information about a text recognized on a screen of the electronic device. The content identification information according to the present disclosure may accurately determine the content identification information of the content currently displayed on a display screen by using not only the channel information of the electronic device but also the address information (e.g., an HTML address) of the information about the in-screen layout of the electronic device.

In addition, the processor according to an embodiment may determine use modes of the electronic device based on whether the screen of the electronic device is switched and the determined content identification information, and may determine the user context by using at least one of a user input received from the user, device use information of the user with respect to the electronic device, operation state information indicating a current operation state of the electronic device, and the content identification information, for each of the determined use modes. As described above, because the processor of the electronic device determines the user context for each use mode of the electronic device, there is an advantage in that the processor of the electronic device is able to better recognize the use situation of the user with respect to the electronic device. In addition, because the processor of the electronic device determines the user context by using the device use information or the like of the user with respect to the electronic device, the processor of the electronic device is able to accurately identify a life pattern of the user and provide more advanced utterance lists.

According to an embodiment, the use modes of the electronic device may include at least one of a search mode for searching for content to be displayed on the electronic device, a device setting mode for reproducing the content, a content reproduction mode, and a content reproduction termination mode, and the operation state information of the electronic device may further include information about a time when the operation of the electronic device is performed. Because the operation state information indicating an operation state of the electronic device according to the present disclosure includes information about the time when the operation of the electronic device is performed, the use situation of the user with respect to the electronic device may be recognized in a time-series manner.

According to an embodiment, the processor may generate the utterance list by using a learning model of an assistant program which is pre-trained based on content identification information and the user context, and, in the case where the learning model of the assistant program is not trained, generate the utterance list by using predefined utterances according to the determined content identification information and the user context. Accordingly, the electronic device according to the present disclosure may improve user convenience by providing the user with an utterance list even in the case where the learning model of the assistant program for generating an utterance list is not trained in a situation in which the electronic device is initially operated.

According to an embodiment, the learning model of the assistant program may be trained by using, as an artificial intelligence algorithm, at least one of machine learning, neural network, genetic, deep learning, and classification algorithms. Because the learning model of the assistant program according to the present disclosure is trained based on various artificial intelligence algorithms, utterance lists corresponding the intention of the user of the electronic device may be generated. According to an embodiment, the learning model of the assistant program may include a language model that is trained according to an artificial intelligence algorithm.

According to an embodiment, the learning model of the assistant program may be trained differently according to at least one of an account of the user, a genre of content displayed on the electronic device, an actor of the content displayed on the electronic device, and a date of viewing the content. For example, the learning model of the assistant program may be trained for each genre of content items preferred by the user and for each actor of the content items, and thus reflect the user's preference for a specific genre or actor of content.

According to an embodiment, the predefined utterance providing event may occur in response to a user input received from the user including the trigger signal for outputting the utterance list. According to another embodiment, the predefined utterance providing event may occur based on at least one of information about a current time, information about current weather, information about a channel maintaining time of the electronic device, operation state information of the electronic device, external input information received from another electronic device connected to the electronic device, and screen switch information of the electronic device. As described above, because the utterance providing event according to the present disclosure may occur in response to a predefined event condition being satisfied even in the case where a user input including the trigger signal is not received, the electronic device 1000 may provide utterance lists even in the case where there is no user input including the trigger signal.

That is, even in the case where the user does not know an additionally provided utterance (Follow Up utterance) or a conversation-opening utterance (Root utterance), the electronic device 1000 according to the present disclosure may improve the user convenience by providing an utterance list in response to the preset event condition being satisfied.

According to an embodiment, the processor may determine an output intensity of the utterance list based on a user response to the output utterance list, and output the generated utterance list as at least one of visual data and voice data (text to speech, TTS) according to the determined output intensity. According to another embodiment, the processor may differently determine intensities of the output utterance lists.

In addition, according to an embodiment, the processor may determine a priority for outputting the utterance list according to the determined content identification information and the determined user context, and output the utterance list according to the determined priority. Accordingly, the electronic device according to the present disclosure may determine output intensities of the output utterance lists to be different from each other, or output the utterance lists according to preset priorities, and thus allow the user to easily respond to the utterance lists.

According to an embodiment, the processor may generate an utterance cluster including at least one utterance list by clustering the generated utterance list according to a service of the electronic device and a type of the content displayed on the electronic device, and output the generated utterance list for each generated utterance cluster. As described above, because the electronic device 1000 may output the generated utterance lists in the utterance clusters, the electronic device 1000 may allow the user to more easily recognize a plurality of utterance lists.

The memory 1700 according to an embodiment may include at least one type of storage medium among a flash memory type, a hard disk type, a multimedia card micro type, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

The one or more instructions (e.g., program instructions for providing an assistant service) stored in the memory 1700 may be classified into a plurality of modules according to functions thereof, for example, into a content identification module, a user context determination module, an utterance list generation module, and an utterance list output module.

Figure 3:
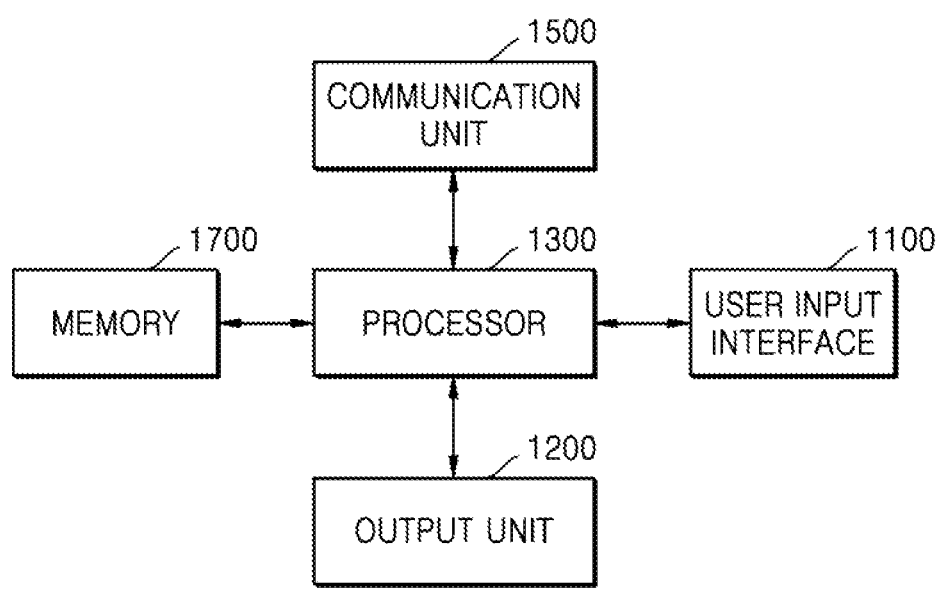
FIG. 3 is a block diagram illustrating an electronic device for providing an assistant service according to another embodiment.

FIG. 3 is a block diagram illustrating the electronic device 1000 for providing an assistant service according to another embodiment.

The electronic device 1000 according to another embodiment may include a user input interface 1100, an output unit 1200, a processor 1300, a communication unit 1500, and a memory 1700. For example, the user input interface 1100 may refer to a means via which a user inputs data for controlling the electronic device 1000. For example, the user input unit 1100 may include, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, a microphone, and the like.

According to another embodiment, the user input interface 1100 may interwork with a microphone or a display module of the electronic device to receive a user voice input and a user's touch input of touching at least one of utterance lists provided on the display panel, and transmit, to the processor 1300, the received user voice input and the received user touch input. According to an embodiment, in the case where the electronic device 1000 is controlled by a remote controller, the user input interface 1100 may receive a control signal from the remote controller (not shown). In the present specification, the control signal received by the electronic device 1000 from the remote controller may include a channel number input, a channel up-down input, and a channel input-related signal on an electronic program guide (EPG) screen.

The output unit 1200, the processor 1300, and the memory 1700 may correspond to the output unit, the processor, and the memory of FIG. 2, respectively, and thus a detailed description thereof will be omitted.

According to an embodiment, the communication unit 1500 may communicate with an external device (not shown) to receive at least one certain content item transmitted through a certain channel. Specifically, the communication unit 1500 may receive at least one of a plurality of content items corresponding to a plurality of channels. Here, the channel may be a broadcast channel. In addition to the broadcast channel, the channel may refer to a content transmission path corresponding to a content provider that transmits certain content. For example, in addition to the broadcast channel, the channel may refer to a transmission path through which a video on demand (VoD) service and/or a streaming content providing service are/is transmitted, and may be represented in the form of a certain number, a certain character, or a combination of a certain character and a certain number like a broadcast channel. For example, a certain streaming movie providing service may be received through channel '20', and a user of a display device 200 may view movie content provided by the certain streaming movie providing service when selecting channel '20'.

The communication unit 1500 may communicate with external devices (not shown) through a wired/wireless network. Here, the external device (not shown) may be a device capable of transmitting certain content to the electronic device 1000 through a certain channel, and may include a broadcasting station server, a content provider server, a content storage device, or the like.

In addition, the communication unit 1500 according to an embodiment may include at least one communication module such as a short-range communication module, a wired communication module, a mobile communication module, a broadcast receiving module, or the like. Here, the at least one communication module may refer to a communication module capable of transmitting and receiving data through a network conforming to communication standards such as a tuner performing broadcast reception, Bluetooth, wireless LAN (WLAN, Wi-Fi), wireless broadband (Wibro), worldwide interoperability for microwave access (Wimax), CDMA, or WCDMA.

Figure 4:
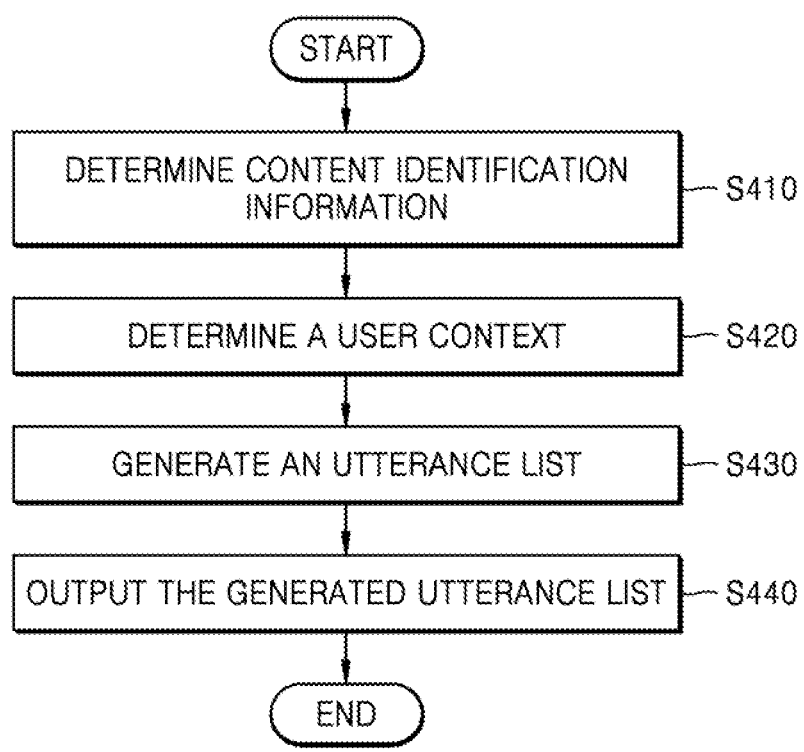
FIG. 4 is a flowchart of a method, performed by an electronic device according to some embodiments, of providing an assistant service.

FIG. 4 is a flowchart of a method, performed by the electronic device according to some embodiments, of providing an assistant service.

In operation S410, the electronic device 1000 may determine content identification information for identifying content displayed on the electronic device. For example, the electronic device 1000 may determine whether a screen of the electronic device is switched, and, in response to the screen of the electronic device being switched, determine the content identification information after a preset period of time elapses from a time point at which the screen of the electronic device is switched.

In the present specification, the content identification information is information for identifying a type of the content displayed on the electronic device 1000, and may be determined based on at least one of channel information of the electronic device, address information of the content displayed on the screen of the electronic device, information about an in-screen layout of the electronic device, and information about a text recognized on the screen of the electronic device.

For example, the channel information used by the electronic device 1000 according to the present disclosure may include information for identifying a broadcast signal for each channel provided from a terrestrial broadcast, a cable broadcast, and a satellite broadcast, and the channel information may include information for identifying broadcast providers. In addition, according to an embodiment, the channel information may be an electronic program guide (EPG), and may include, in addition to image quality information and broadcasting time information of image content provided through each channel, at least one of title information, episode information, and charge information of the content. The address information of content according to the present disclosure may include URL information as information indicating a source of the content.

For example, in the case where information of a currently displayed channel indicates a home shopping channel, the electronic device 1000 may identify currently displayed content as a home shopping program. According to another embodiment, the electronic device 1000 may recognize a text displayed on a screen, and, in the case where the detected text includes the name of a music director, an actor, a lighting director, a writer, or the like, may identify the currently displayed content as a movie program.

In operation S420, the electronic device 1000 may determine a user context of the user of the electronic device. The user context according to the present disclosure may include information related to a situation of the user using the electronic device, and the electronic device 1000 may identify the situation of the user currently using the electronic device by using the user context. For example, in the case where the user turns on the electronic device, changes the channel from a default channel to Channel 11 and then changes the channel from Channel 11 to Channel 24, the user context may include a channel change order of the user, identification information of each content displayed through each channel, and the like. This is merely an embodiment of the present disclosure, and the user context is not limited thereto. According to another embodiment, the user context may include, but is not limited to, information about a manner of the user using the electronic device and a consumption order of content items consumed in a time series according to the manner of the user using the electronic device.

For example, the electronic device 1000 according to the present disclosure may determine use modes of the electronic device based on whether a screen of the electronic device is switched and the determined content identification information, and may determine the user context by using at least one of a user input received from the user, device use information of the user with respect to the electronic device, operation state information indicating a current operation state of the electronic device, and the content identification information, for of the each determined use modes. The operation state information according to the present disclosure may further include information about a time when the operation of the electronic device is performed. For example, in the case where the user turns on the electronic device 1000 in the morning, the operation state information may include information that the electronic device 1000 is currently in a power-on state, power was applied to the electronic device at 7:30 AM, and the current sound volume of the electronic device is LOW.

According to an embodiment, in the present specification, the use modes of the electronic device may include at least one of the search mode for searching for content to be displayed on the electronic device, the device setting mode for reproducing the content, the content reproduction mode, and the content reproduction termination mode. However, the use modes of the present specification are not limited to the above-described modes, and may include more use modes according to the user's needs.

For example, in the case where the user of the electronic device 1000 turns on the electronic device 1000, the electronic device 1000 may determine the use modes of the electronic device as the "search mode" based on whether the display panel is switched from an OFF state to an ON state and identification information of content displayed on the default channel. In the case where a user input for switching between channels is received from the user in a state in which the use mode of the electronic device is determined as the "search mode", the electronic device 1000 may provide an utterance list including, for example, "Recently viewed episodes", "Is there something new?", and "Find a Tom Cruise movie".

According to another embodiment, in the case where a user input for switching between channels is received a preset number of times or more in a state where the use modes of the electronic device are determined as the "search mode", the electronic device 1000 may provide utterance lists for content recommendation.

According to an embodiment, in the case where the user turns on the electronic device for the first time in the morning, the electronic device 1000 may provide utterance lists such as "How is the fine dust today?", "How is the weather?", and "Show me the news". According to another embodiment, in the case where predetermined weather information is received from the outside in a state where the user turns on the electronic device for the first time in the morning (e.g., in the case where weather information indicating that it is raining or snowing is received), the electronic device 1000 may provide an utterance list such as "Should I wear a coat tomorrow?" According to another embodiment, in the case where a new external input is received from another electronic device connected to the electronic device 1000, the electronic device 1000 may provide an utterance list such as "Change the source to the connected external device".

In operation S430, the electronic device 1000 may generate an utterance list by using the learning model of the assistant program that is trained according to the determined content identification information and the user context. For example, the electronic device 1000 may generate the utterance list by using the learning model of the assistant program which receives the content identification information and the user context as inputs and outputs at least one utterance list. Because the learning model of the assistant program according to the present disclosure is trained by using the content identification information and the user context of the user of the electronic device as inputs, there is an advantage of securing more contact points for machine learning, deep learning, selective learning, and the like.

The utterance list according to the present disclosure may refer to a list of sentences or phrases for communication between the electronic device 1000 and the user, when the electronic device as a conversation driver (C.D) is used as a virtual interlocutor. According to an embodiment, the learning model of the assistant program may be a learning model that is trained by using at least one of machine learning, neural network, genetic, deep learning, and classification algorithms as an artificial intelligence algorithm. Furthermore, the learning model of the assistant program according to the present disclosure may generate the utterance list differently according to at least one of an account of the user of the electronic device, a genre of content displayed on the electronic device, an actor of the content displayed on the electronic device, and a date of viewing the content.

According to an embodiment, in the case where the learning model of the assistant program is not trained, the electronic device 1000 may generate the utterance list by using pre-stored utterances to be matched with the content identification information and the user context of the user of the electronic device. That is, the electronic device 1000 according to the present disclosure may not use the learning model of the assistant program, and may generate the utterance list by using the utterances matched with the content identification information and the user context and pre-stored in the memory.

In operation S440, in the case where the predefined utterance providing event occurs, the electronic device 1000 may output the generated utterance list. For example, the electronic device 1000 may determine an output intensity of the utterance list based on a response to the output utterance list received from the user of the electronic device, and output the generated utterance list according to the determined output intensity, as at least one of visual data and voice data (text to speech, TTS). The outputting of the voice data through the speaker by the electronic device 1000 according to the present disclosure may be based on a text to speech (TTS) conversion that converts a generated utterance list text into a voice. According to an embodiment, the electronic device 1000 may determine the output intensity of the utterance list to be output in the future by checking acceptance frequencies of the user for the output utterance list.

For example, in the case where the electronic device 1000 according to the present disclosure provides the utterance list to the user by displaying visual data including the generated utterance list on the display of the electronic device 1000, the electronic device 1000 may determine the output intensity of the utterance list based on at least one of a thickness of the utterance list text displayed on the display, a size of the utterance list text displayed on the display, and a color of the utterance list displayed on the display. Specifically, in the case where a user input of selecting "Show me the price information" is received most frequently among utterance lists including "Show me the price information", "Make an order", and "Show me the product information" which may be provided in displaying a home shopping program, the electronic device 1000 may display a text "Show me the price information" in a larger size than those of other utterance lists.

According to another embodiment, in the case where the electronic device 1000 outputs voice data including the generated utterance list through the speaker, the electronic device 1000 may determine the output intensity of the utterance list by adjusting a sound volume when outputting the utterance list through the speaker. Specifically, in the case where the user input of selecting "Show me the price information" is received most frequently among the utterance lists including "Show me the price information", "Make an order", and "Show me the product information" which may be provided in displaying the home shopping program, the electronic device 1000 may output "Show me the price information" with a highest sound volume through the speaker.

According to an embodiment, the electronic device 1000 may generate an utterance cluster including at least one utterance list by clustering the generated utterance list according to the service of the electronic device and the type of content displayed on the electronic device, and may output the generated utterance lists for each generated utterance cluster. The utterance clusters according to the present disclosure may refer to utterance capsules as criteria for clustering the utterance lists of the electronic device in service units and functional units of the electronic device 1000.

According to another embodiment, the electronic device 1000 may receive a response to the output utterance list from the user of the electronic device, and may update the previously generated utterance list by using the received response of the user. In addition, in the case where the output utterance list includes only one utterance, the electronic device 1000 may execute a corresponding function by recognizing only a simple response (e.g., "Yes", "No", "Uh-huh", and "Maybe next time") of the user to the output utterance list.

In the present specification, the user of the electronic device may select at least one utterance list from among the utterance lists output by the electronic device 1000, and thus execute a function of the electronic device corresponding to the selected utterance list. However, the user may select utterances that may be executed by the electronic device, from among not only the utterance lists currently output by the electronic device 1000 but also utterance lists that are not currently output by the electronic device 1000. Therefore, the electronic device 1000 may receive a user input of selecting an utterance not included in the utterance lists that are not currently output, and may execute a function of the electronic device corresponding to the received user input.

Figure 5:
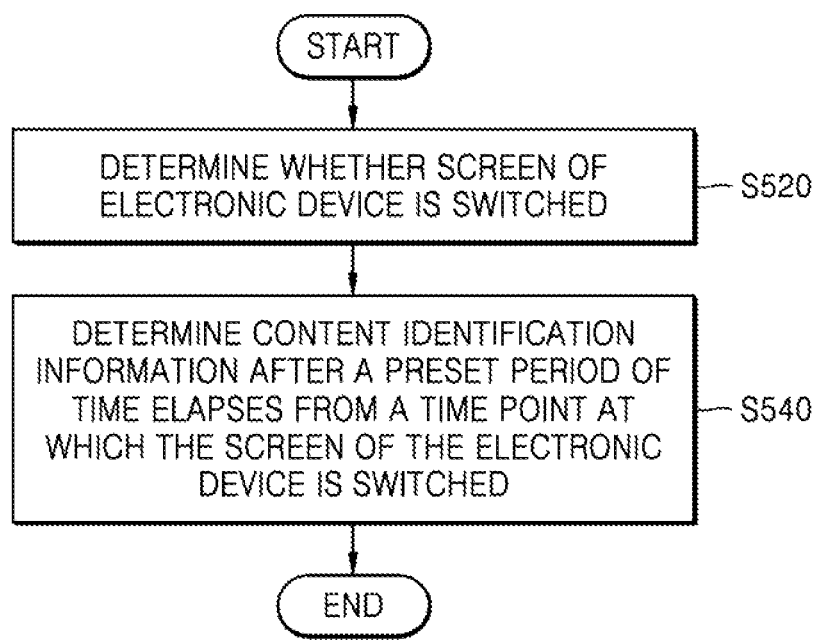
FIG. 5 is a diagram illustrating a method, performed by the electronic device according to some embodiments, of determining content identification information.

FIG. 5 is a diagram illustrating a method, performed by the electronic device according to some embodiments, of determining content identification information.

In operation S520, the electronic device 1000 may determine whether a screen of the electronic device is switched. For example, the electronic device 1000 may determine whether the screen of the electronic device is switched based on at least one of channel information of the electronic device, address information (e.g., HTML) of the content displayed on the screen of the electronic device, information about an in-screen layout of the electronic device, a user input received from the user, and information about a text recognized on the screen of the electronic device.

Specifically, in the case where the address information of the content displayed on the current screen indicates a content search page, the electronic device 1000 may determine that the current screen is a first screen for the content search page, and, in response to reception of a user input of selecting a specific content item, may determine that the screen is switched to a second screen for reproducing the content item. According to another embodiment, in the case where only one image is currently displayed on the second screen after 4*3=12 images are displayed on the first screen, the electronic device 1000 may determine whether the screen is switched by recognizing information about the in-screen layout of the electronic device.

In operation S540, the electronic device 1000 may determine the content identification information after a preset period of time elapses from a time point at which the screen of the electronic device is switched. For example, the electronic device 1000 may determine a certain content identification time point for determining the content identification information for each switched screen, and may determine the content identification information of content displayed at the determined content identification time point. Because the electronic device 1000 according to the present disclosure may determine the content identification information of content displayed at a certain content identification time point, rather than at the time point at which the screen is switched, the content may be more accurately identified.

Figure 6:
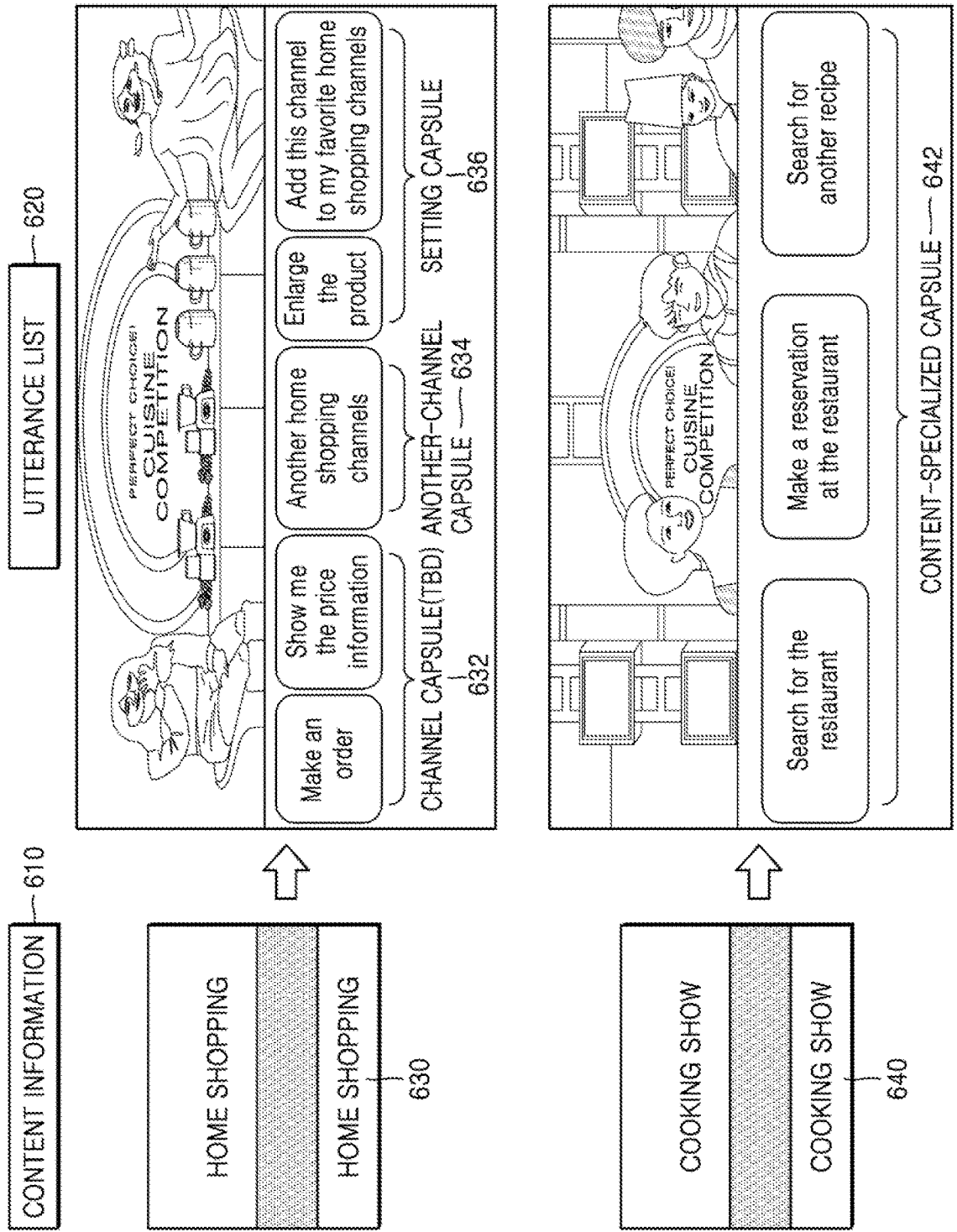
FIG. 6 is a diagram for comparing utterance lists provided by an electronic device according to some embodiments, according to content types.

FIG. 6 is a diagram for comparing utterance lists provided by the electronic device 1000 according to some embodiments, according to content types.

The electronic device 1000 according to the present disclosure may generate an utterance list by using the learning model of the assistant program which is trained according to the content identification information and the user context of the user of the electronic device. That is, the electronic device 1000 according to the present disclosure may generate different utterance lists according to the identification information of the content displayed on the screen.

Referring to FIG. 6, in the case where the content identification information of the content displayed on the electronic device 1000 is information about home shopping 630, the electronic device 1000 may provide utterance lists such as "Make an order", "Show me the price information", "Another home shopping channel", "Enlarge the product", and "Add this channel to my favorite home shopping channels". On the other hand, in the case where the content identification information of the content displayed on the electronic device 1000 is information about a cooking show 640, the electronic device 1000 may provide utterance lists such as "Search for the restaurant", "Make a reservation at the restaurant", and "Search for another recipe". That is, the electronic device 1000 according to the present disclosure may provide different utterance lists according to the content identification information of the content displayed on the electronic device 1000.

The electronic device 1000 according to the present disclosure may generate, as utterance clusters for clustering the generated utterance lists, a channel capsule (TBD) 632 including utterance lists related to the current channel, an other-channel capsule 634 including utterance lists regarding other channels related to the current channel, a setting capsule 636 including utterance lists regarding a resolution or a device setting application in the current electronic device, and a content-specialized capsule 642 including utterance lists preset for each content, cluster an utterance list into the generated utterance clusters, and provide the clustered utterance lists in the utterance clusters.

For example, in the case where the content identification information of the content displayed on the electronic device 1000 is information about home shopping 630, the electronic device 1000 may generate utterance lists such as "Make an order", "Show me the price information", "Another home shopping channel", "Enlarge the product", and "Add this channel to my favorite home shopping channels", generate utterance clusters for classifying the generated utterance lists, and group and display, on the screen, the utterance lists related to the channel capsule 632 among the generated utterance clusters.

Figure 7:
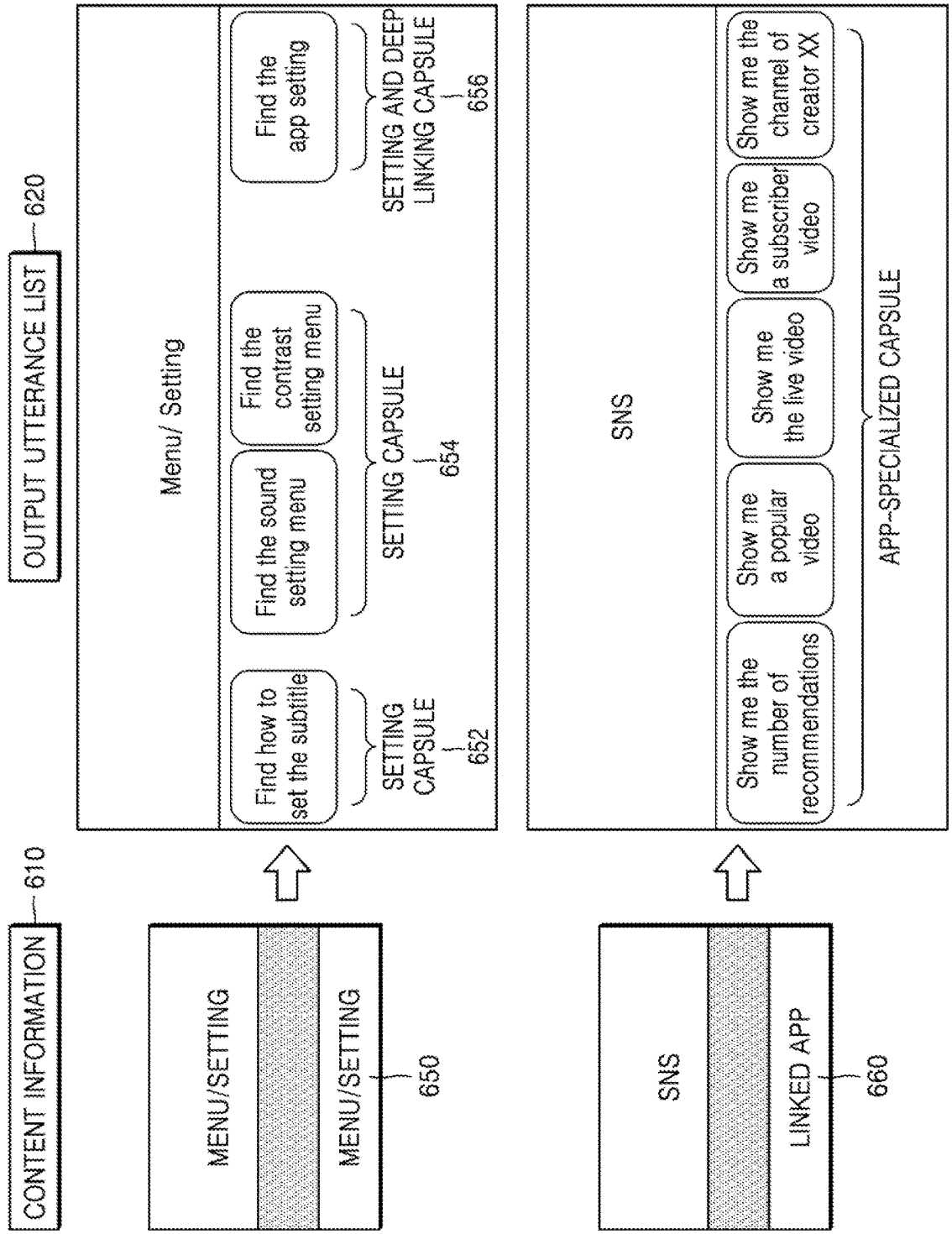
FIG. 7 is a diagram for comparing utterance lists provided by an electronic device according to some embodiments, according to content types.

FIG. 7 is a diagram for comparing utterance lists provided by the electronic device according to some embodiments, according to content types.

Referring to FIG. 7, in the case where the content identification information of the content displayed on the electronic device 1000 is information about menu setting 650, the electronic device 1000 may provide utterance lists such as "Find how to set the subtitle," "Find the sound setting menu", "Find the contrast setting menu," and "Find the app setting". On the other hand, in the case where the content identification information of the content displayed on the electronic device 1000 is information about a linked app 640, the electronic device 1000 may provide utterance lists such as "Show me the number of recommendations", "Show me a popular video", "Show me the live video", "Show me a subscriber video", and "Show me the channel of creator XX". That is, the electronic device 1000 according to the present disclosure may provide different utterance lists according to the content identification information of the content displayed on the electronic device 1000.

In addition, the electronic device 1000 may generate, as utterance clusters for clustering the generated utterance lists, a setting capsule 652 including utterance lists regarding subtitle setting or the like in the current electronic device, a setting capsule 654 including utterance lists related to display setting and sound volume setting of the current electronic device, a setting and deep linking capsule 656 including utterance lists that are output by a learning model that is trained according to a deep learning algorithm based on applications related to the content displayed on the current electronic device and the identification information of the content, to output a related application, and an app-specialized capsule 662 including utterance lists preset for each application, and may output the utterance lists in the generated utterance clusters.

Figure 8:
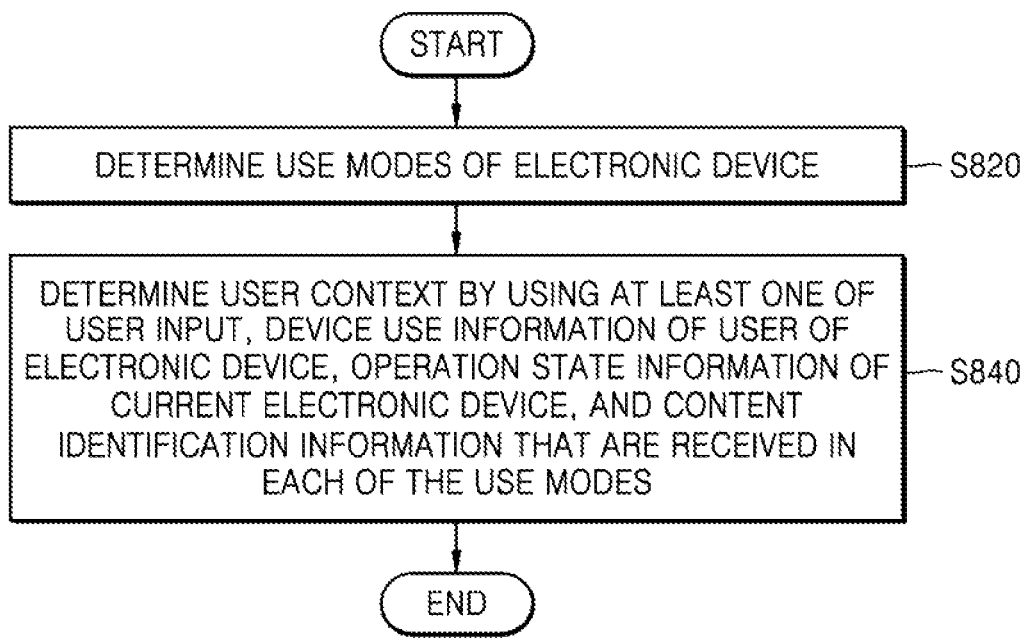
FIG. 8 is a diagram illustrating a method, performed by an electronic device according to some embodiments, of determining a user context.

FIG. 8 is a diagram illustrating a method, performed by the electronic device according to some embodiments, of determining a user context.

In operation S820, the electronic device 1000 may determine use modes of the electronic device. For example, the electronic device 1000 may determine a user context for determining a use situation of the user of the electronic device based on whether the screen of the electronic device 1000 is switched and the determined content identification information. In the present specification, the use modes are units for classifying a plurality of functions provided by the electronic device, and may broadly include at least one of a content search mode, a device setting mode, a content reproduction mode, and a reproduction termination mode.

In operation S840, the electronic device 1000 may determine the user context by using at least one of a user input of the user of the electronic device, device use information of the user of the electronic device, operation state information of the current electronic device, and content identification information that are received in each of the use modes. According to an embodiment, the device use information of the user of the electronic device may include information about content items that the user frequently watched by using the electronic device, information about function characteristics of the electronic device that the user frequently used, and the like. In addition, the operation state information of the electronic device according to the present disclosure may be information about a function of the electronic device that the electronic device is currently performing, and may include information about on and off states of the electronic device, an intensity of a sound signal being currently output by the electronic device, and information about a brightness of a screen. The user context according to the present disclosure corresponds to the user context described in operation S420 of FIG. 4, and thus a detailed description thereof will be omitted.

FIG. 9 is a diagram illustrating the use modes of the electronic device used by the electronic device according to some embodiments, to determine the user context.

Use modes 920 of the electronic device 1000 according to the present disclosure may include at least one of a search mode 922, a device setting mode 924, a content reproduction mode 926, and a content termination mode 928. According to an embodiment, the content search mode 922 may refer to a mode for searching for content to be reproduced in the electronic device, and the device setting mode 924 may refer to a mode for device setting for reproducing content. For example, the device setting mode 924 may be a mode provided by the electronic device 1000 in order to adjust contrast setting, a sound volume, and a brightness of the electronic device before reproducing content.

According to an embodiment, the reproduction mode 926 may refer to a mode for reproducing selected content. For example, in the reproduction mode 926, the electronic device 1000 may provide the user with content selected based on a user input, in full screen. The termination mode 928 according to the present disclosure may refer to a mode for providing additional content related to the content provided to the user, when the electronic device 1000 completes or almost completes the reproduction of the content.

Figure 10:
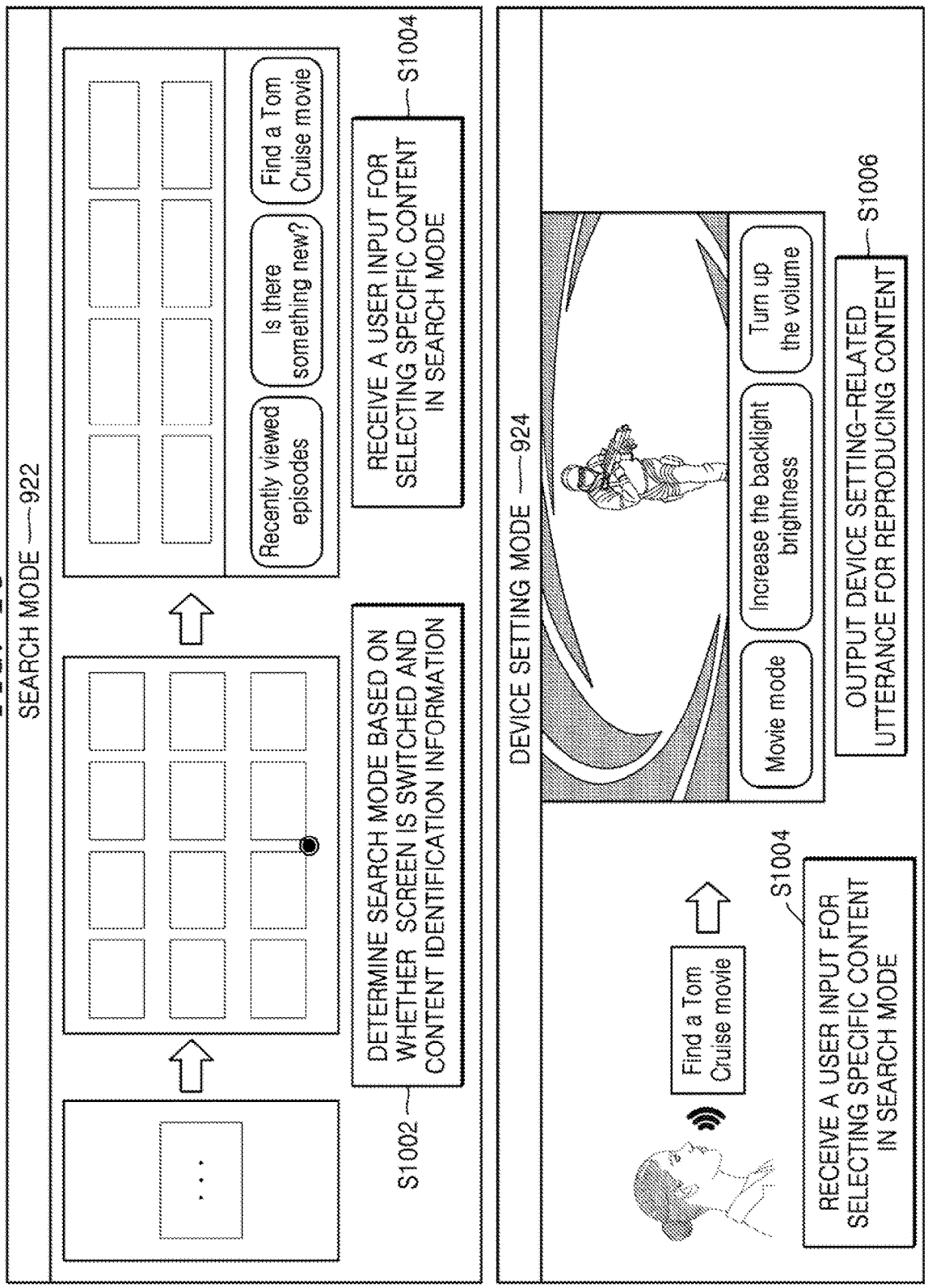
FIG. 10 is a diagram illustrating a method, performed by an electronic device according to some embodiments, of determining a user context of a user for each use mode.

FIG. 10 is a diagram illustrating a method, performed by the electronic device according to some embodiments, of determining the user context of the user for each of the use modes.

In operation S1002, the electronic device 1000 may determine the use mode of the electronic device based on whether the screen of the electronic device is switched and the determined content identification information. For example, the electronic device 1000 may determine whether the screen is switched from a first screen in a power-off state to a second screen in which 4*3=12 content screens are provided, and may determine the use mode of the electronic device as the "search mode" in the case where the address information of content currently provided on the second screen indicates a content search page. In the case where the current use mode of the electronic device 1000 is determined as the search mode, the electronic device 1000 may provide utterance lists such as "Recently viewed episodes", "Is there something new?", and "Find a Tom Cruise movie".

In operation S1004, the electronic device 1000 may receive a user input for selecting specific content in response to the utterance lists provided in the "search mode", and may provide a screen for selecting content to be reproduced in the electronic device 1000 based on the received user input. In addition, the user may select one of the utterance lists such as "Recently viewed episodes", "Is there something new?", and "Find a Tom Cruise movie" provided by the electronic device 1000, or may execute a function of the electronic device by selecting other executable utterance lists other than the utterance lists output by the electronic device. That is, the user of the electronic device may infer the utterance lists that are not currently output by the electronic device but are executable by the electronic device, by considering the utterance lists provided by the electronic device.

Accordingly, in the case where the user utters "Find Mission: Impossible" similarly to "Find a Tom Cruise movie", the electronic device 1000 may provide a screen for selecting a corresponding movie as content. According to another embodiment, the electronic device 1000 may recognize a user voice input such as "Find a Tom Cruise movie" from the user, thus provide a list of movies starring Tom Cruise, recognize a user input of selecting one movie from among the provided list of the movies starring Tom Cruise, and thus provide a screen for reproducing the selected movie.

In operation S1006, in the case where a user input of selecting certain content is received in the search mode 922, the electronic device 1000 may determine the current use mode of the electronic device 1000 as the device setting mode 924, and may provide device setting-related utterance lists for reproducing the selected certain content. For example, in the case where the user selects a movie as the content to be displayed on the electronic device, the electronic device 1000 may provide a list of utterances such as "Movie mode", "Increase the backlight brightness", and "Turn up the volume".

Figure 11:
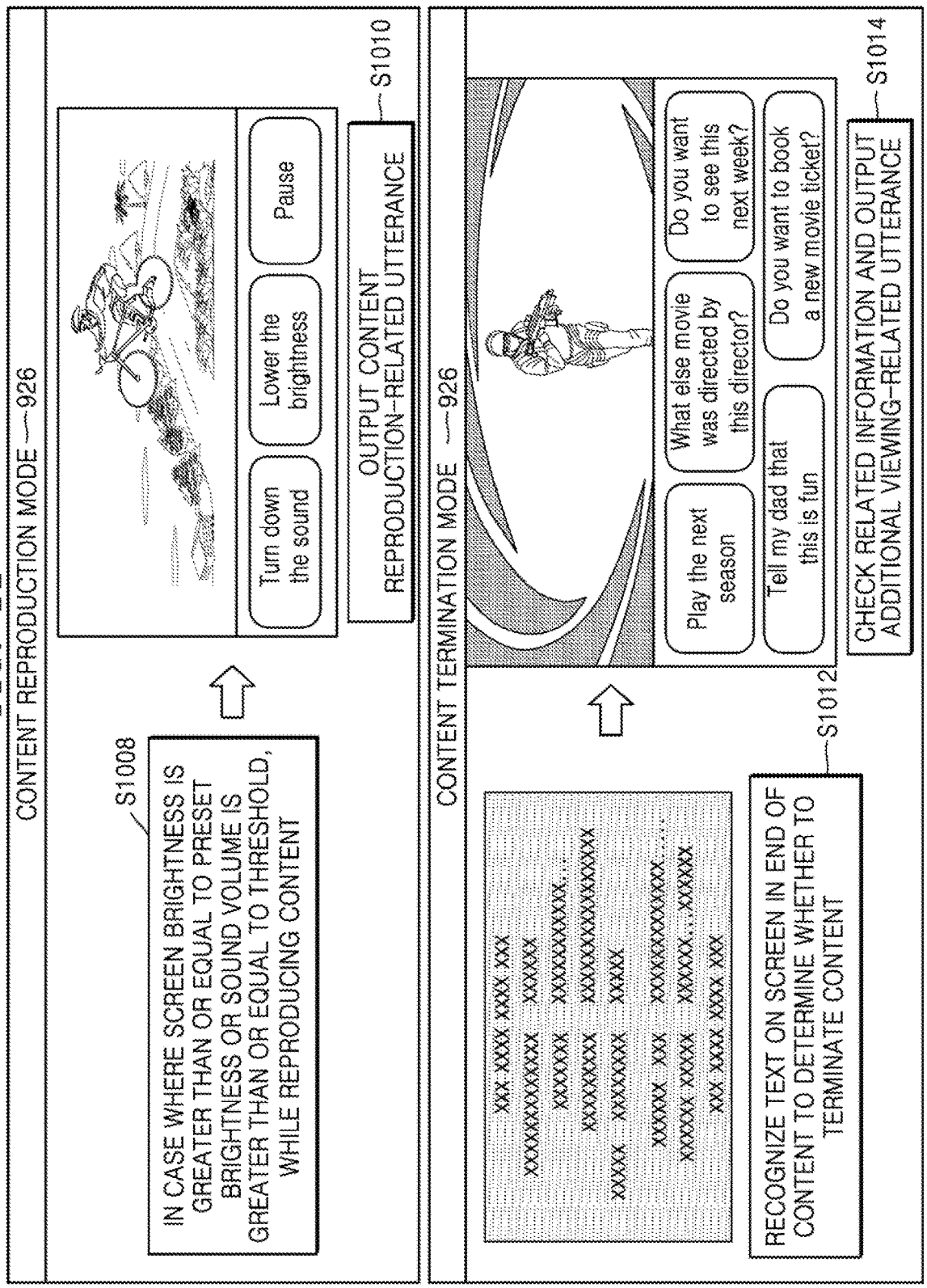
FIG. 11 is a diagram illustrating a method, performed by an electronic device according to some embodiments, of determining a user context of a user for each use mode.

FIG. 11 is a diagram illustrating a method, performed by the electronic device according to some embodiments, of determining the user context of the user for each of the use modes.

In operation S1008, in the case where a preset period of time elapses after device setting is completed in the device setting mode 924, the electronic device 1000 may determine the current use mode of the electronic device 1000 as the content termination mode. According to another embodiment, the electronic device 1000 may determine the current use mode of the electronic device as the content reproduction mode 926 based on whether the screen of the electronic device is switched and the content identification information. According to an embodiment, the electronic device 1000 may determine whether a screen brightness is greater than or equal to a preset brightness or whether the volume of an output sound is greater than or equal to a preset threshold, while reproducing the content. In the present specification, the preset brightness and the preset threshold may be preset and stored based on a user input.

In operation S1010, in the case where the screen brightness is greater than or equal to the preset brightness or whether the volume of the output sound is greater than or equal to the preset threshold while reproducing the content, the electronic device 1000 may output content reproduction-related utterance lists, such as "Turn down the sound", "Lower the brightness", and "Pause". The user of the electronic device 1000 may watch a movie in an environment suitable for watching a movie by selecting one utterance list from the output utterance lists. However, the user may also select utterance lists that may be performed by the electronic device in addition to the utterance lists output on the display screen, by considering the output utterance lists. That is, in the case where a user input of selecting an utterance list that is not currently output on the display screen is received, the electronic device 1000 according to the present disclosure may execute a corresponding function based on the received user input.

In operation S1012, the electronic device 1000 may determine the use mode of the electronic device 1000 as the content termination mode 928 by using a running time of the content and information about a text recognized on the current screen. According to an embodiment, in the case where 90% or greater of the entire running time of the current content is progressed and a text related to end credits is recognized on the current screen, the electronic device 1000 may determine the use mode of the electronic device 1000 as the content termination mode 928.

In operation S1014, in the case where the use mode of the electronic device is determined as the content termination mode 928, the electronic device 1000 may provide utterance lists such as "Play the next season", "What else movie was directed by this director?", "Do you want to see this next week?", "Tell my dad that this is fun", and "Do you want to book a new movie ticket". That is, in the case where the use mode of the electronic device is determined as the content termination mode 928, the electronic device 1000 may check information related to the current content, 90% or greater of the entire running time of which is progressed, or may provide utterance lists for viewing additional content related to the content being currently reproduced.

Figure 12:
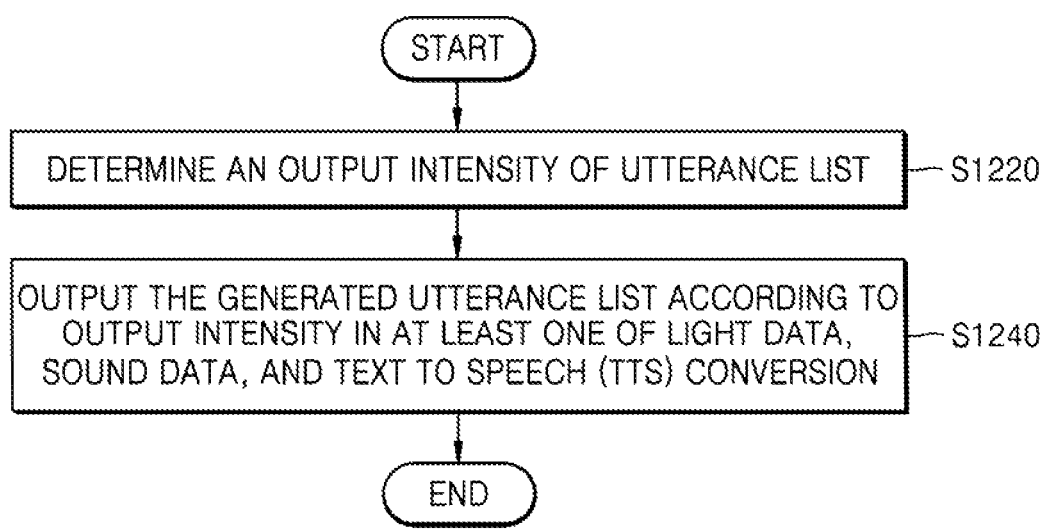
FIG. 12 is a diagram illustrating a method, performed by an electronic device according to some embodiments, of outputting an utterance list according to an output intensity of the utterance list.

FIG. 12 is a diagram illustrating a method, performed by the electronic device according to some embodiments, of outputting an utterance list according to the output intensity of the utterance list.

In operation S1220, the electronic device 1000 may determine an output intensity of the utterance list based on a response to the output utterance list received from the user of the electronic device. For example, the electronic device 1000 according to the present disclosure may output the utterance list as visual data or voice data. According to an embodiment, the electronic device 1000 may store a history of selecting, by the user, one utterance list from among the output utterance lists, and may determine the output intensity of the utterance list to be output in the future by counting the number of times each of the utterance lists is selected based on the stored history of the user. That is, the electronic device 1000 according to an embodiment may determine the output intensities of the utterance lists that the user has frequently selected in the past among the utterance lists, to be higher than the output intensities of the utterance lists that the user has not frequently selected. For example, the electronic device 1000 may display an image of the utterance list that the user has frequently selected in the past, in a larger size.

For example, in the case where the electronic device 1000 according to the present disclosure provides the utterance list to the user by displaying visual data including the generated utterance list on the display of the electronic device 1000, the electronic device 1000 may determine the output intensity of the utterance list by adjusting at least one of a thickness of an utterance list text displayed on the display, a size of the utterance list text displayed on the display, and a color of the utterance list displayed on the display. According to another embodiment, in the case where the electronic device 1000 outputs voice data including the generated utterance list through the speaker, the electronic device 1000 may determine the output intensity of the utterance list by adjusting a sound volume when outputting the utterance list through the speaker.

In operation S1240, the electronic device 1000 may output the generated utterance list according to the determined output intensity in at least one manner of light data, sound data, and text to speech (TTS) conversion. The electronic device 1000 according to the present disclosure may output the voice data including the generated utterance list based on text to speech (TTS) conversion.

FIG. 13 is a diagram illustrating conditions for the electronic device to output a generated utterance list.

According to an embodiment, in response to the occurrence of a predefined utterance providing event 1350, the electronic device 1000 may output a generated utterance list. The utterance providing event 1350 according to the present disclosure may occur in the case where predefined event conditions 1360 are satisfied or a trigger signal 1370 is included in a user input or an external input received by the electronic device 1000. That is, the electronic device 1000 according to the present disclosure may provide an utterance list by itself in response to the occurrence of the predefined event conditions 1360 even in the case where there is no user input from the user, unlike conventional electronic devices that output an utterance list.

According to an embodiment, the predefined event conditions 1360 may occur based on at least one of information about a current time, information about current weather, information about a channel maintaining time of the electronic device, operation state information of the electronic device, external input information received from another electronic device connected to the electronic device, and screen switch information of the electronic device.

Specifically, the predefined event conditions 1360 may occur in the cases where the screen of the electronic device 1000 is maintained for a preset period of time and then a user input related to help is received from the user (e.g., when a user voice input such as "Help me" is received) (1362), where the electronic device 1000 operates for the first time in the morning (1363), where the electronic device operates for the first time in the morning and predefined weather information is received (1364), where an input signal is received from another electronic device connected to the electronic device (1365), where a preset period of time elapses after the screen of the electronic device 1000 is switched (1366), and where other conditions directly set by the user are satisfied (1367).

According to another embodiment, the utterance providing event according to the present disclosure may occur in response to reception of a predefined user voice input that triggers the utterance providing event, such as "Help me, Bixby", from the user, or in response to reception of a user input of pressing a "Help" button on a remote control device (e.g., a remote controller) wirelessly connected to the electronic device 1000. That is, according to an embodiment, a user input of "Help me, Bixby" or pressing the "Help" button on the remote controller is the trigger signal 1370, and may cause the utterance providing event, which is a condition for the electronic device 1000 to output the generated utterance list, to occur. According to an embodiment, in the case where the predefined utterance providing event occurs, the electronic device 1000 may turn on the microphone to automatically receive a user voice input.

Figure 14:
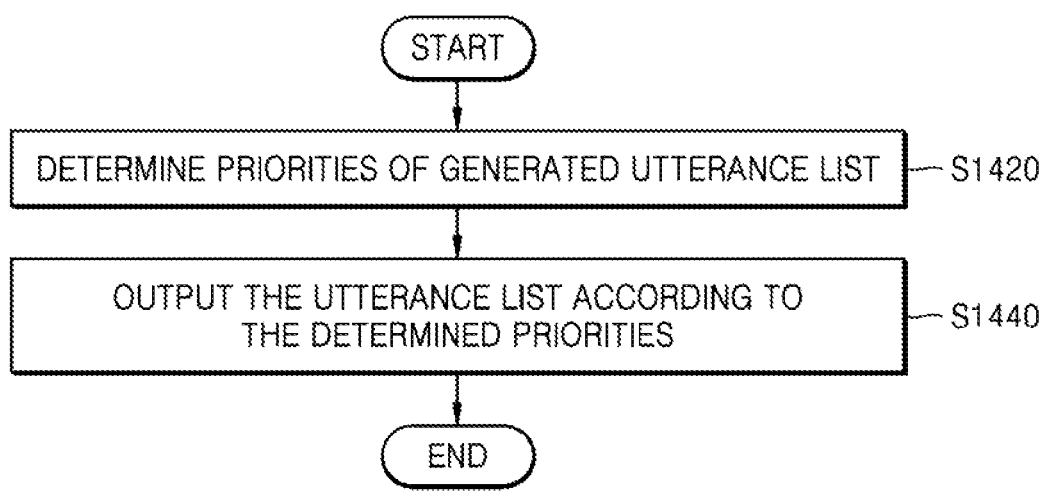
FIG. 14 is a diagram illustrating a method, performed by an electronic device according to some embodiments, of outputting an utterance list according to priorities.

FIG. 14 is a diagram illustrating a method, performed by the electronic device according to some embodiments, of outputting an utterance list according to priorities.

In operation S1420, the electronic device 1000 may determine priorities for outputting the utterance list according to the content identification information and the determined user context. According to an embodiment, before determining a second priority of the utterance lists based on the content identification information and the user context of the user of the electronic device, the electronic device 1000 may first determine a first priority for outputting clusters. That is, the electronic device 1000 may first determine the first priority of the utterance clusters for classifying the utterance lists based on the content identification information and the user context, and then determine the second priority of the generated utterance lists.

In operation S1440, the electronic device 1000 may output the utterance lists according to the determined priorities. In the case where the electronic device 1000 first determines the first priority of the utterance clusters and then determines the second priority of the utterance lists, the electronic device 1000 may output the utterance lists based on at least one of the determined first priority and the determined second priority.

FIG. 15 is a diagram illustrating a screen on which the utterance lists generated by the electronic device according to some embodiments are output according to the priorities.

According to an embodiment, in the case where the content identification information of the content displayed on the electronic device 1000 is information related to a sports channel, the electronic device 1000 may output utterance lists such as "Soccer mode", "Increase the backlight brightness", "What's up next?", "Show the program information", and "Show me the schedule". In addition, the utterance lists (e.g., "Soccer mode", "Increase the backlight brightness", "What's up next?", "Show the program information", and "Show me the schedule") output by the electronic device 1000 may be classified into utterance clusters including a setting capsule 1562 including utterance lists related to display setting for reproducing the content displayed on the current channel, a channel capsule 1564 including utterance lists related to the current channel, and a deep linking capsule 1566 including utterance lists related to a learning model that is trained according to a deep learning algorithm based on content identification information of the content being currently displayed, and then output.

According to another embodiment, in the case where the content identification information of the content displayed on the electronic device 1000 is information related to a drama channel, the electronic device 1000 may output utterance lists such as "Continue to watch", "Play 'XX from the Star'", "Recently viewed episode?", "Is there something new?" and "Notification setting". In addition, the utterance lists (e.g., "Continue to watch", "Play 'My Love from the Star'", "Recently viewed episode?", "Is there something new?" and "Notification setting") output by the electronic device 1000 may be classified into utterance clusters including an app-specialized capsule 1568 including utterance lists preset for each application, a recommended command capsule 1572 including recommendation utterance lists in relation to content being currently reproduced, and a setting capsule 1574 including utterance lists related to function setting of the electronic device, and then output. The utterance clusters according to the present disclosure may refer to utterance capsules as criteria for clustering the utterance lists of the electronic device in service units and functional units of the electronic device 1000.

Figure 16:
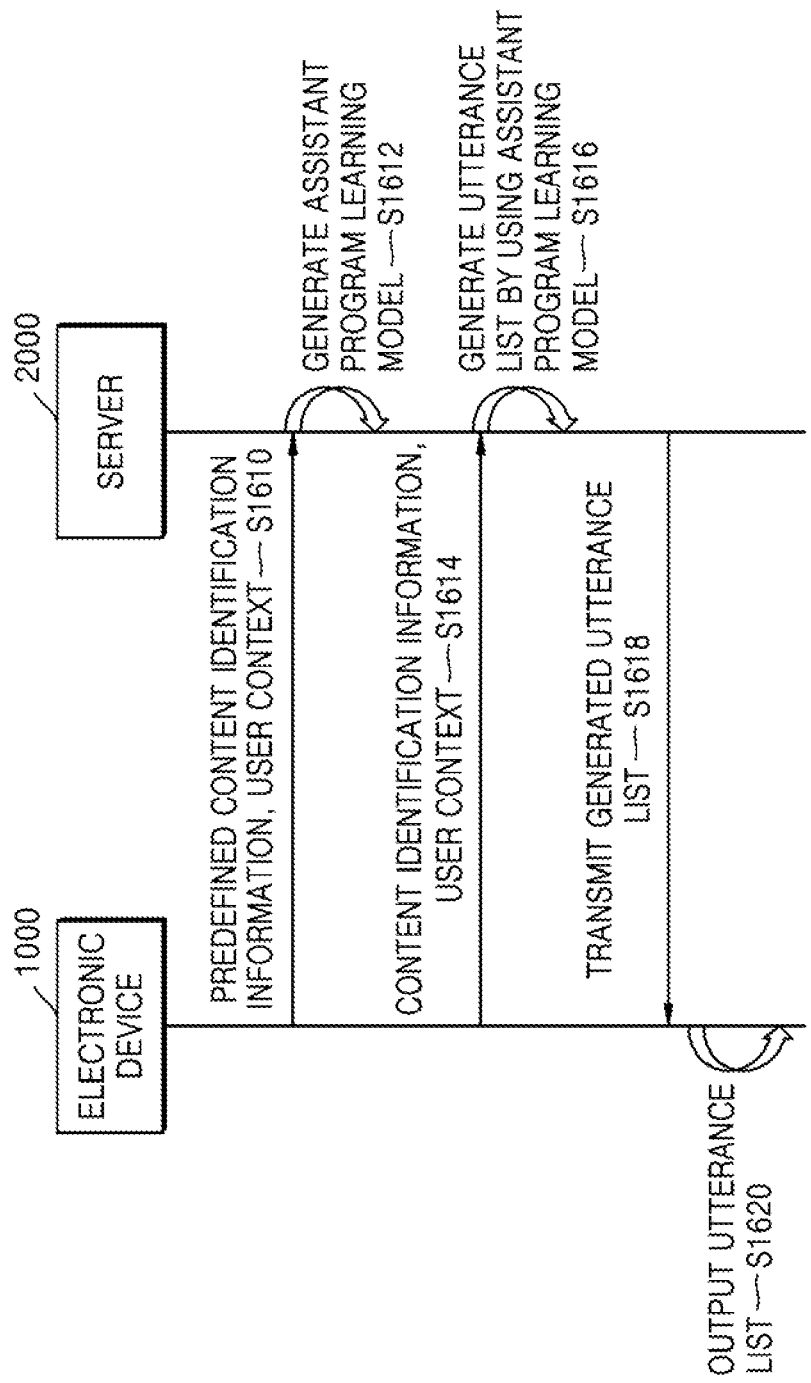
FIG. 16 is a diagram illustrating a method, performed by an electronic device according to some embodiments, of providing an assistant service by interworking with a server.

FIG. 16 is a diagram illustrating a method, performed by the electronic device according to some embodiments, of providing an assistant service by interworking with a server.

According to an embodiment, the electronic device 1000 may provide an assistant service by using a server 2000.

In operation S1610, the electronic device 1000 may determine content identification information of content displayed on the electronic device 1000 and a user context of the user of the electronic device, and may transmit the determined content identification information and the determined user context to the server 2000.

In operation S1612, the server 2000 may generate an assistant program learning model by using the received content identification information and the received user context. The generating of the assistant program learning model by the server 2000 according to the present disclosure may be training of the assistant program learning model for outputting an utterance list. According to an embodiment, the server 2000 may train in advance the assistant program learning model that outputs an utterance list to the user, based on the received content identification information and the received user context.

In operation S1614, the electronic device 1000 may determine the content identification information of the content displayed on the electronic device 1000 and a user context of the user currently using the electronic device 1000, and may transmit, to the server 2000, the determined content identification information of the current content and the determined user context.

In operation S1616, the server 2000 may generate at least one utterance list by using the assistant program learning model that receives the content identification information and the user context as inputs and outputs at least one utterance list. In operation S1618, the server 2000 may transmit the generated utterance lists to the electronic device 1000. In operation S1620, the electronic device 1000 may output the received utterance lists. That is, according to an embodiment, the electronic device 1000 may generate the utterance list based on the content identification information and the user context of the electronic device user by itself by using the assistant program learning model stored in the memory, but, alternatively, may generate the utterance list by using the assistant program learning model stored in the server 2000.

Figure 17:
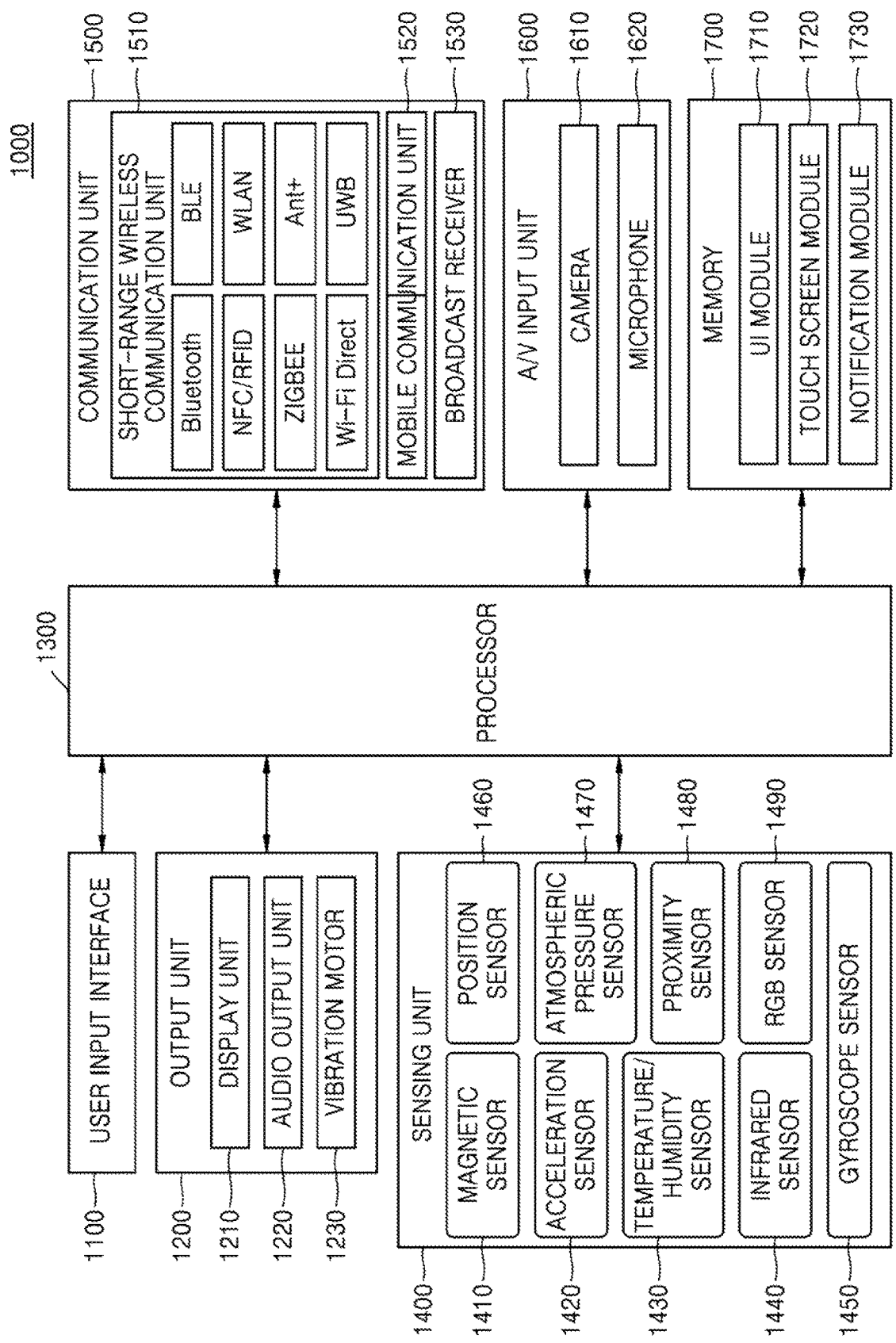
FIG. 17 is a block diagram illustrating an electronic device for providing an assistant service according to another embodiment.

FIG. 17 is a block diagram illustrating the electronic device for providing an assistant service according to another embodiment.

The electronic device 1000 according to an embodiment may include the user input interface 1100, the output unit 1200, a processor 1300, a sensing unit 1400, the communication unit 1500, an NV input unit 1600, and the memory 1700. However, all of the illustrated components are not essential components. The electronic device 1000 may be implemented by more components than the illustrated components, or the electronic device 1000 may be implemented by fewer components than the illustrated components.

The user input interface 1100 is via which the user inputs data for controlling the electronic device 1000. For example, the user input interface 1100 may include, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, and the like. The user input interface 1100 according to the present disclosure may interwork with the NV input unit 1600 to receive a user voice input from the user. According to an embodiment, in the case where the electronic device 1000 is controlled by a remote control device (e.g., a remote controller), the user input interface 1100 may receive a control signal from the remote control device.

The output unit 1200 may output an audio signal, a video signal, or a vibration signal, and the output unit 1200 may include a display unit 1210, an audio output unit 1220, and a vibration motor 1230. The display unit 1210 includes a screen for displaying and outputting information processed by the electronic device 1000. In addition, the screen may display an image. The audio output unit 1220 may output audio data received from the communication unit 1500 or stored in the memory 1700. Also, the audio output unit 1220 may output an audio signal related to a function (e.g., a call signal reception sound, a message reception sound, and a notification sound) performed by the electronic device 1000.

The processor 1300 generally controls the overall operation of the electronic device 1000. For example, the processor 1300 may generally control the user input unit 1100, the output unit 1200, the sensing unit 1400, the communication unit 1500, the A/V input unit 1600, and the like by executing programs stored in the memory 1700. In addition, the processor 1300 may perform the functions of the electronic device 1000 described in FIGS. 1 to 15 by executing the programs stored in the memory 1700.

Specifically, the processor 1300 may control the user input unit 1100 to receive a user voice input and a user input of touching the display panel of the electronic device 1000. The processor 1300 may control a microphone 1620 to receive a voice input of the user. The processor 1300 may execute an application that performs an operation of the electronic device 1000 based on a user input, and may perform control to receive a user input through the executed application. For example, the processor 1300 may execute a voice assistant application and control the executed application to receive a voice input of the user through the microphone 1620. According to another embodiment, in the case where a user-predefined utterance providing event occurs, the processor 1300 may prepare to receive a voice input of the user by turning on the power of the microphone to receive a voice input of the user.

The processor 1300 may control the output unit 1200 and the memory 1700 of the electronic device 1000 to output utterance lists. The processor 1300 may determine content identification information for identifying content displayed on the display, determine a user context for identifying a use situation of the user of the electronic device by using the determined content identification information, generate an utterance list by using the learning model of the assistant program that is trained according to the determined content identification information and the user context, and control the output unit 1200 and the memory 1700 to output the generated utterance list in response to the occurrence of the predefined utterance providing event.

The processor 1300 may train the learning model by inputting training data (e.g., predefined content identification information and user contexts) to the learning model.

For example, the processor 1300 may train the learning model for generating an utterance list by inputting training data to a plurality of learning models (a learning model for interpreting a user input (e.g., a user voice), a learning model for generating a response message to be provided to the user, and a learning model for determining an output intensity of the response message) stored in the memory 1700 or the server 2000.

The processor 1300 may receive a response to the output utterance list from the user of the electronic device through the user input interface, and may generate an utterance list different from the generated utterance list by using the received response. In addition, in the case where the received user input includes a trigger signal for outputting the utterance list, the processor 1300 may output the generated utterance list. In addition, the processor 1300 may determine whether a screen of the electronic device is switched, and, in response to the screen of the electronic device being switched, determine the content identification information after a preset period of time elapses from a time point at which the screen of the electronic device is switched.

In addition, the processor 1300 may determine the use mode of the electronic device based on whether a screen of the electronic device is switched and the determined content identification information, and may determine the user context by using at least one of a user input received from the user, device use information of the user with respect to the electronic device, operation state information indicating a current operation state of the electronic device, and the content identification information, for each of the determined use modes.

The sensing unit 1400 may detect a state of the electronic device 1000 or a state of the periphery of the electronic device 1000, and may transmit the detected information to the processor 1300. The sensing unit 1400 may be used to generate some of specification information of the electronic device 1000, state information of the electronic device 1000, surrounding environment information of the electronic device 1000, state information of the user, and device use history information of the user.

The sensing unit 1400 may include, but is not limited to, at least one of a magnetic sensor 1410, an acceleration sensor 1420, a temperature/humidity sensor 1430, an infrared sensor 1440, a gyroscope sensor 1450, a position sensor (e.g., a GPS) 1460, an atmospheric pressure sensor 1470, a proximity sensor 1480, and an RGB sensor 1490. A function of each sensor may be intuitively deduced from the name by one of ordinary skill in the art, and thus a detailed description thereof is omitted.

The communication unit 1500 may include one or more components that allow the electronic device 1000 to communicate with another electronic device (not shown) and the server 2000. The another device (not shown) may be a computing device like the electronic device 1000 or a sensing device, but is not limited thereto. For example, the communication unit 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth Low Energy (BLE) communication unit, a near field communication (NFC) unit, a WLAN (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 1520 transmits and receives a wireless signal to and from at least one of a base station, an external terminal, and a server on a mobile communication network. Here, the wireless signal may include various types of data according to transmission and reception of voice call signals, video call signals, or text/multimedia messages.

The broadcast receiver 1530 receives a broadcast signal and/or broadcast-related information from the outside via a broadcast channel. The broadcast channels may include satellite channels and terrestrial channels. According to an embodiment, the electronic device 1000 may not include the broadcast receiver 1530. In addition, in the case where the assistant program learning model is present in the server 2000, the communication unit 1500 may transmit, to the server 2000, the content identification information and information about the user context for identifying the use situation of the user of the electronic device, for training the assistant program learning model. In addition, the communication unit 1500 may receive the generated utterance lists from the server 2000.

The audio/video (NV) input unit 1600 is via which an audio signal or a video signal is input, and may include a camera 1610, a microphone 1620, and the like. The camera 1610 may obtain an image frame such as a still image or a moving image by using an image sensor, in a video call mode or a capturing mode. An image captured by the image sensor may be processed by the processor 1300 or a separate image processor (not shown). An image captured by the camera 1610 may be utilized as context information of the user.

The microphone 1620 receives an external audio signal, and processes the received audio signal into electrical voice data. For example, the microphone 1620 may receive an audio signal from an external device or the user. The microphone 1620 may receive a voice input of the user. The microphone 1620 may perform various denoising algorithms for removing noise occurring when the external audio signal is being received.

The memory 1700 may store a program for processing and control by the processor 1300, and may store data input to the electronic device 1000 or output from the electronic device 1000. In addition, the memory 1700 may store the learning model of the assistant program for generating an utterance list, and the utterance lists generated by using the learning model of the assistant program. Furthermore, the memory 1700 may further store the learning model for interpreting a user input (e.g., a user voice), the learning model for generating a response message to be provided to the user, and learning models for determining an output intensity of a response message.

Also, the memory 1700 may further store a neural network trained based on the learning model for interpreting a user input (e.g., a user voice), the learning model for generating a response message to be provided to the user, and the learning models for determining an output intensity of a response message, layers for specifying a structure of the neural network, and information about weights between the layers.

The memory 1700 may include at least one type of storage medium among a flash memory type, a hard disk type, a multimedia card micro type, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk. The programs stored in the memory 1700 may be classified into a plurality of modules according to functions thereof, for example, into a user interface (UI) module 1710, a touch screen module 1720, a notification module 1730, and the like.

The UI module 1710 may provide a specialized UI, a graphical user interface (GUI), or the like that interworks with the electronic device 1000, for each application. The touch screen module 1720 may detect a touch gesture on a touch screen by the user, and may transmit information about the touch gesture to the processor 1300. The touch screen module 1720 according to some embodiments may recognize and analyze touch code. The touch screen module 1720 may be configured as separate hardware including a controller.

The notification module 1730 may generate a signal for notifying of the occurrence of an event in the electronic device 1000. Examples of the event occurring in the electronic device 1000 may include call signal reception, message reception, key signal input, schedule notification, and the like. The notification module 1730 may output a notification signal in the form of a video signal through the display unit 1210, output a notification signal in the form of an audio signal through the audio output unit 1220, or output a notification signal in the form of a vibration signal through the vibration motor 1230.

Figure 18:
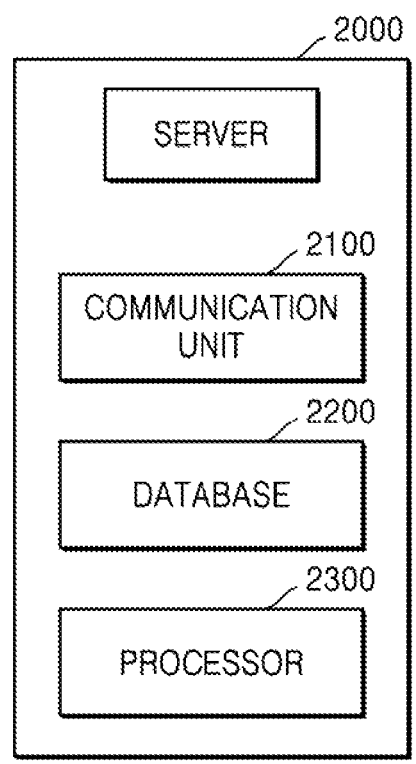
FIG. 18 is a block diagram illustrating a server interworking with an electronic device according to some embodiments.

FIG. 18 is a block diagram illustrating a server interworking with the electronic device according to some embodiments.

The server 2000 according to the present disclosure may include a communication unit 2100, a database 2200, and a processor 2300.

The communication unit 2100 may include one or more components that enable communication with the electronic device 1000. The communication unit 2100 may receive, from the electronic device 1000, the content identification information and the information about the user context of the user of the electronic device, or may receive the assistant program learning model trained in the electronic device. In addition, the communication unit 2100 may transmit, to the electronic device 1000, the utterance lists generated by using the assistant program learning model in the server.

The DB 2200 may store a neural network trained based on an assistant program learning model for outputting an utterance list based on the content identification information and the user context, the learning model for interpreting a user input (e.g., a user voice), the learning model for generating a response message to be provided to the user, and the learning models for determining an output intensity of a response message, and training data input to the neural network. In addition, the DB 2200 may further store utterance lists matched with the content identification information and the user context received from the electronic device 1000.

The processor 2300 generally controls the overall operation of the server 2000. For example, the processor 2300 may generally control the DB 2200 and the communication unit 2100 by executing programs stored in the DB 2200 of the server 2000. The processor 2300 may perform some of the operations of the electronic device 1000 of FIGS. 1 to 17 by executing the programs stored in the DB 2200.

The processor 2300 may control the communication unit 2100 to receive, from the electronic device 1000, the content identification information and the user context of the user, and may generate utterance lists to be provided to the user by using the assistant program learning model which receives the received content identification information and the user context of the user as inputs. The processor 2300 may transmit the generated utterance lists to the electronic device 1000 through the communication unit 2100.

Some embodiments may be implemented as a recording medium including computer-executable instructions such as a computer-executable program module. A computer-readable medium may be any available medium which is accessible by a computer, and may include a volatile or non-volatile medium and a removable or non-removable medium. Also, the computer-readable media may include computer storage media. The computer storage media include both volatile and non-volatile, removable and non-removable media implemented in any method or technique for storing information such as computer readable instructions, data structures, program modules or other data.

In addition, in the present specification, the term "unit" may be a hardware component such as a processor or a circuit, and/or a software component executed by a hardware component such as a processor.

The above-described description of the present disclosure is provided only for illustrative purposes, and those of skill in the art will understand that the present disclosure may be easily modified into other detailed configurations without modifying technical aspects and essential features of the present disclosure. Therefore, it should be understood that the above-described embodiments are exemplary in all respects and are not limited. For example, the elements described as single entities may be distributed in implementation, and similarly, the elements described as distributed may be combined in implementation.

The scope of the present disclosure is not defined by the detailed description of the present disclosure but by the following claims, and all modifications or alternatives derived from the scope and spirit of the claims and equivalents thereof fall within the scope of the present disclosure.

The invention claimed is:

1. A method of providing an assistant service, performed by an electronic device, the method comprising:
   determining content identification information for identifying content displayed on the electronic device;
   determining a plurality of use modes of the electronic device based on whether a screen of the electronic device is switched and the content identification information;
   determining a user context for identifying a use situation of a user of the electronic device, based on at least one of a user input received from the user, device use information of the user with respect to the electronic device, operation state information indicating a current operation state of the electronic device, and the content identification information, for each of the plurality of use modes;
   generating an utterance list based on the determined content identification information and the determined user context, for each of the plurality of use modes; and
   in response to an occurrence of a predefined utterance providing event, outputting the utterance list corresponding to one of the plurality of use modes.

2. The method of claim 1, wherein the use modes of the electronic device comprise at least one of a search mode for searching for content to be displayed on the electronic device, a device setting mode for reproducing the content, a content reproduction mode, and a content reproduction termination mode, and the operation state information of the electronic device further comprises information about a time when an operation of the electronic device is performed.

3. The method of claim 1, wherein the predefined utterance providing event occurs when a user input received from the user includes a trigger signal for the outputting of the utterance list.

4. The method of claim 1, wherein the predefined utterance providing event occurs based on at least one of information about a current time, information about current weather, information about a channel maintaining time of the electronic device, operation state information of the electronic device, external input information received from another electronic device connected to the electronic device, and screen switch information of the electronic device.

5. The method of claim 1, wherein the outputting of the utterance list comprises:
   determining an output intensity of the utterance list based on a user response to the output utterance list; and
   outputting the generated utterance list as at least one of visual data and voice data (text to speech (TTS)) according to the determined output intensity.

6. The method of claim 1, wherein the outputting of the utterance list comprises:
   determining a priority for the outputting of the utterance list according to the determined content identification information and the determined user context; and
   outputting the utterance list according to the determined priority.

7. The method of claim 1, wherein the outputting of the utterance list further comprises
   generating an utterance cluster including at least one utterance list by clustering the generated utterance list according to a service of the electronic device and a type of the content displayed on the electronic device, and
   outputting the generated utterance list for the each generated utterance cluster.

8. The method of claim 1, wherein the determining of the content identification information comprises:
   determining whether the screen of the electronic device is switched; and,
   in response to the screen of an electronic device being switched, determining the content identification information after a preset period of time elapses from a time point at which the screen of the electronic device is switched.

9. The method of claim 8, wherein the content identification information is determined based on at least one of channel information of the electronic device, address information of the content displayed on the screen of the electronic device, information about an in-screen layout of the electronic device, and information about a text recognized on the screen of the electronic device.

10. The method of claim 1, wherein the generating of the utterance list comprises:
    generating the utterance list by using a learning model of an assistant program which is pre-trained based on the content identification information and the user context; and,
    when the learning model of the assistant program is not trained, generating the utterance list by using predefined utterances according to the determined content identification information and the user context.

11. The method of claim 10, wherein the learning model of the assistant program is a learning model that is trained by using at least one of machine learning, neural network, genetic, deep learning, and classification algorithms as an artificial intelligence algorithm.

12. The method of claim 10, wherein the learning model of the assistant program generates different utterance lists according to at least one of an account of the user, a genre of the content displayed on the electronic device, an actor of the content displayed on the electronic device, and a date of viewing the content.

13. An electronic device for providing an assistant service, the electronic device comprising:
    an output unit;
    a memory storing one or more instructions; and
    one or more processors configured to provide the assistant service by executing the one or more instructions to:
        determine content identification information for identifying content displayed on the electronic device;
        determine a plurality of use modes of the electronic device based on whether a screen of the electronic device is switched and the context identification information;
        determine a user context for identifying a use situation of a user of the electronic device, based on at least one of a user input received from the user, device use information of the user with respect to the electronic device, operation state information indicating a current operation state of the electronic device, and the content identification information, for each of the plurality of use modes;
        generate an utterance list based on the determined content identification information and the determined user context, for each of the plurality of use modes; and
        in response to an occurrence of a predefined utterance providing event, output the utterance list corresponding to one of the plurality of use modes.

14. A non-transitory computer-readable recording medium having recorded thereon a program which, when executed, causes an electronic device to perform operations, the operations comprising:
    determining content identification information for identifying content displayed on the electronic device;
    determining a plurality of use modes of the electronic device based on whether a screen of the electronic device is switched and the content identification information;
    determining a user context for identifying a use situation of a user of the electronic device, based on at least one of a user input received from the user, device use information of the user with respect to the electronic device, operation state information indicating a current operation state of the electronic device, and the content identification information, for each of the plurality of use modes;
    generating an utterance list based on the determined content identification information and the determined user context, for each of the plurality of use modes; and
    in response to an occurrence of a predefined utterance providing event, outputting the utterance list corresponding to one of the plurality of use modes.

* * * * *